(12) United States Patent
Ahuja et al.

(10) Patent No.: US 9,044,673 B1
(45) Date of Patent: Jun. 2, 2015

(54) SYSTEMS AND METHODS FOR PROVIDING AN INTERACTIVE HANDS-FREE VIDEO GAME TUTORIAL

(71) Applicant: Glu Mobile Inc., San Francisco, CA (US)

(72) Inventors: Sourabh Ahuja, San Francisco, CA (US); Lian A. Amaris, Oakland, CA (US); Liang Wu, San Francisco, CA (US)

(73) Assignee: Glu Mobile Inc., San Francisco, CA (US)

( * ) Notice: Subject to any disclaimer, the term of this patent is extended or adjusted under 35 U.S.C. 154(b) by 0 days.

(21) Appl. No.: 14/247,177

(22) Filed: Apr. 7, 2014

Related U.S. Application Data

(60) Provisional application No. 61/905,140, filed on Nov. 15, 2013, provisional application No. 61/905,808, filed on Nov. 18, 2013.

(51) Int. Cl.
   *G07F 17/32* (2006.01)
   *A63F 13/12* (2006.01)
   *A63F 13/40* (2014.01)

(52) U.S. Cl.
   CPC .................................... *A63F 13/10* (2013.01)

(58) Field of Classification Search
   USPC ....................................................... 463/29
   See application file for complete search history.

(56) References Cited

U.S. PATENT DOCUMENTS

| | | | |
|---|---|---|---|
| 7,953,246 B1 * | 5/2011 | Tu et al. | 382/103 |
| 8,156,067 B1 * | 4/2012 | Tu et al. | 706/47 |
| 2011/0109548 A1 * | 5/2011 | Tu et al. | 345/158 |
| 2011/0306395 A1 | 12/2011 | Ivory et al. | |
| 2011/0306396 A1 | 12/2011 | Flury et al. | |
| 2013/0123079 A1 | 5/2013 | Peritz et al. | |
| 2013/0260886 A1 | 10/2013 | Smith | |
| 2013/0267318 A1 | 10/2013 | Pryor et al. | |

OTHER PUBLICATIONS

International Search Report and Written Opinion in PCT Application No. PCT/US2014/065844, 12 pages, mailed Mar. 5, 2015.

* cited by examiner

*Primary Examiner* — Pierre E Elisca
(74) *Attorney, Agent, or Firm* — Morgan, Lewis & Bockius LLP

(57) ABSTRACT

Systems and methods for providing a tutorial for a video game are provided. The tutorial is characterized by a hierarchical data structure having a plurality of nodes connected by edges. Each node represents a video game stage and provides oral instructions on how to progress to another node. An edge represents head movements necessary to move to another node. At a computing device a current node is identified and the oral instructions associated with the node are provided. User head movements are sensed by a movement measuring component of the computing device and the current node and sensed user head movements are compared to edges associated with the current node. When a match is found, advancement to the node identified by the matching edge occurs. However, advancement is forgone when the user head movements do not match the head movements of any of the edges associated with the current node.

30 Claims, 15 Drawing Sheets

SYSTEMS AND METHODS FOR PROVIDING AN INTERACTIVE HANDS-FREE VIDEO GAME TUTORIAL

CROSS REFERENCE TO RELATED APPLICATIONS

This patent application claims the benefit of U.S. Provisional Application Ser. No. 61/905,140, filed Nov. 15, 2013, and titled "SYSTEMS AND METHODS FOR PROVIDING AN INTERACTIVE HAND-FREE VIDEO GAME TUTORIAL."

This patent application claims the benefit of U.S. Provisional Application Ser. No. 61/905,808, filed Nov. 18, 2013, and titled "SYSTEMS AND METHODS FOR PROVIDING AN INTERACTIVE HAND-FREE VIDEO GAME TUTORIAL."

Both of the above-identified patent applications are hereby incorporated by reference in their entireties.

TECHNICAL FIELD

The implementations disclosed herein relate generally to providing an interactive hands-free video game tutorial.

BACKGROUND

The rapid advance in smart phones and tablet devices has led to a corresponding expansion in the number and quality of gaming applications that can be played on portable devices. Now, the portable computing field is expanding into new classes of devices that allow for virtually hands-free participation. Such devices, for instance worn as glasses, rely upon precise measurement of head movements using precise miniaturized measuring devices within such devices, such as gyroscopes, accelerometers, and compasses. These head movements serve as commands within applications that run on such devices.

With the successful introduction of such promising hands-free devices, one problem facing the electronic gaming industry is how to port highly developed gaming applications, each with a broad customer base, to hands-free devices. Users of such gaming applications on conventional devices (e.g., desktop computers) are familiar with all the conventional hand movement type commands necessary to use and excel at such games. But hand movement type commands do not directly port to devices that port to virtually hands-free participation. This forces the user to learn a whole new set of commands in the form of head movements.

Such hand-free devices also provide the opportunity for developing gaming applications for which there are no counterparts running on conventional smart phones and tablets.

Regardless of its origins, the rules for controlling each game must be reduced to a set of head movements. This poses a challenge to the gaming enthusiasts interested in hand-free devices. As noted in a famous quote attributed Albert Einstein "You have to learn the rules of the game. And then you have to play better than anyone else." Yet, with a gaming application on a hand-free device, not only must the gaming enthusiast learn the "rules" of each gaming application, the user must also learn the precise head movement that corresponds to each rule or command. For example, if an affirmative yes/no type head nod is assigned to one game command, the user must not only know the game command, but also that a yes/no type head nod/shake is used to enact this command, and furthermore must train for a while to learn precisely the best way to enact the yes/no head nod/shake in order to reliably communicate the command. For instance, how far to nod, how quickly to shake, and so forth. Moreover, a hands-free game may have several stages, and the user must learn the head commands associated with each stage.

Thus with new hands-free technology, in which head movements serve as gaming commands, comes a burden on users that has not been addressed by the art: how to teach a user the rules of a game. Thus, as the above background makes clear, what are needed in the art are systems and methods for informing users how to use gaming applications on hand free devices.

SUMMARY

The present disclosure addresses the technical problems in the art. What are provided are systems and methods for teaching gaming enthusiasts how to play gaming applications on hand free devices. The gaming application is initiated in a special training mode and a user is advanced through a series of game stages with the help of a voice narrative. The voice narrative is responsive to at which game stage the user is, and advises the user on what is required to move to another stage. For instance, the gaming application may involve forming a word from a scrambled set of letters. The voice narrative instructs the user to drag the first letter of word to the bottom of the display in order to form the first letter of the word. Responsive to this voice narrative, the user makes head movements and learns which head movements will comply with the voice narrative's directive. Once the user has successfully moved the first letter, the voice narrative tells the user to drag the second letter of the word down to the bottom of the screen next to the first letter. In some implementations, the voice narrative optionally provides the user with an accolade upon the successful completion of each command. In some implementations, the voice narrative optionally provides the user with an accolade upon the successful completion of all the commands in the voice narrative. In this way, players use head controls for virtually hands-free participation as they explore the commands associated with a new gaming application. The systems and methods of the present disclosure advantageously inform users of the rules of the game in a pleasing easy to use manner, thereby allowing them to more quickly enjoy the game. Because of this, the systems and methods of the present disclosure increase the chances of user game acceptance, thereby translating into more enjoyable gaming experience and commercial success for game developers.

The gaming application is initiated in a special training mode and the user is advanced through a series of game stages with the help of a voice narrative. The voice narrative is responsive to which game stage the user is at, and advises the user on what is required to move to another stage. For instance, the gaming application may involve forming a word from a scrambled set of letters. The voice narrative instructs the user to drag the first letter of word to the bottom of the display in order to form the first letter of the word. Responsive to this voice narrative, the user makes head movements and learns which head movements will comply with the voice narrative's directive. Once the user successfully moves the first letter, the voice narrative tells the user to drag the second letter of the word down to the bottom of the screen next to the first letter. In some implementations, the voice narrative optionally provides the user with an accolade upon the successful completion of each command. In some implementations, the voice narrative optionally provides the user with an accolade upon the successful completion of all the commands in the voice narrative. In this way, players use head controls for virtually hands-free participation as they explore the commands associated with a new gaming application. The systems and methods of the present disclosure advantageously inform the user of the rules of the game in a pleasing easy to use manner, thereby allowing them to more quickly enjoy the game. Because of this, the systems and methods of the present disclosure increase the chances of user game acceptance, thereby translating into more enjoyable gaming experience and commercial success for game developers.

In some implementations, a method for providing a tutorial for a first video game is provided. The tutorial is characterized by a hierarchical data structure having a plurality of nodes connected by edges in a plurality of edges. Each node in the plurality of nodes represents (i) a game stage in the first video game, and (ii) a set of oral instructions on how to progress to another node in the plurality of nodes. Each edge in the plurality of edges represents one or more head movements necessary to move from one node to another node in the plurality of nodes. In some implementations, the method is performed at a computing device having one or more processors, as well as memory storing (i) one or more programs for execution by the one or more processors, (ii) the hierarchical data structure, and (iii) instructions for executing the first video game.

In some implementations, the method includes identifying a current node in the plurality of nodes; providing, to a user of the first video game on the computing device, a first set of oral instructions associated with the current node, on how to progress to another node in the plurality of nodes; and sensing one or more head movements of the user via one or more head movement measuring components within the computing device. The one or more head movements are made by the user within a predetermined time interval after providing to the user the first set of oral instructions.

In some implementations, the method also includes matching the current node and the sensed one or more head movements to one or more edges associated with the current node. The matching comprises comparing the one or more sensed head movements to the head movements associated with each edge in the one or more edges.

In some implementations, the method further includes (i) causing the user to be advanced to the node identified by the matching edge when a determination is made that the sensed one or more head movements corresponds to the one or more head movements of an edge in the one or more edges associated with the current node, and (ii) forgoing advancing the user to another node when a determination is made that the sensed one or more head movements do not correspond to the one or more head movements of any of the one or more edges associated with the current node.

In some implementations, the forgoing further comprises providing to the user a second set of oral instructions, associated with the current node, on how to progress to another node in the plurality of nodes.

In some implementations, the one or more head movement measuring components includes a gyroscope (e.g., a 3-axis gyroscope), an accelerometer, or a compass. In some implementations, the first set of oral instructions and the second set of oral instructions are the same. In some implementations, the first set of oral instructions is distinct from the second set of oral instructions. In some implementations, the first set of oral instructions includes only audio instruction, and the second set of oral instructions includes both audio and video instruction.

In some implementations, the first set of oral instructions is associated with a first length, the second set of oral instructions is associated with a second length, and the second length is greater than the first length. In some implementations, the first set of oral instructions is associated with a first detail level, the second set of oral instructions is associated with a second detail level, and the second detail level is greater than the first detail level. In some implementations, the second set of oral instructions is selected from a pool (e.g., a group or a set) of instructions including different sets of oral instructions. In some implementations, the second set of oral instructions is selected from a pool of instructions in accordance with prior instruction to the user. In some implementations, the second set of oral instructions does not overlap with any prior instruction to the user. In some implementations, the second set of instructions is identified from a head movement of an edge in the one or more edges. In some implementations, the second set of instructions is identified from an identity of the current node and an identity of a head movement in the sensed one or more head movements.

In some implementations, the forgoing advancing the user to another node comprises placing the user at a node in the plurality of nodes that precedes the current node. In some implementations, the forgoing advancing the user to another node comprises: maintaining the user at the current node; and reducing a total number of remaining attempts associated with the current node. In some implementations, the node identified by the matching edge is connected with the current node by two or more edges. In some implementations, a respective edge in the two or more edges represents a distinct head movement that is necessary to move from the current node to the node identified by the matching edge. In some implementations, a respective edge in the two or more edges is associated with a reward to the user for progressing from the current node to the node identified by the matching edge. In some implementations, the reward is an in-game reward (e.g., virtual currency within the first video game) or an out-of-game reward.

In some implementations, the out-of-game reward is a promotion for an out-of-game purchase. In some implementations, the promotion for an out-of-game purchase is one of: a discount for purchasing a second video game, a discount for purchasing merchandize described in the first video game, a discount for purchasing merchandize promoted by a publisher of the first video game, and a discount on an upsell of the first video game. In some implementations, the first video game is a spelling game for words or phrases. In some implementations, the first set of oral instructions includes audio instructions provided to the user via an audio output device associated with the computing device. In some implementations, the first set of oral instructions includes video instruction provided to the user via a video output device associated with the computing device.

In some implementations, comparing the one or more sensed head movements to the head movements associated with each edge in the one or more edges includes, comparing one or more characteristics of a sensed head movement in the one or more sensed head movements with one or more characteristics associated with head movements associated with an edge in the one or more edges. The one or more characteristics of the sensed head movement include one of: a speed associated with the sensed head movement, an acceleration associated with the sensed head movement, a degree of the sensed head movement, and a direction of the sensed head movement.

In some implementations, the predetermined time interval within which the one or more head movements are made by the user after being provided the first set of oral instructions is determined in accordance with a profile associated with the user. In some implementations, the profile associated with the user includes information obtained from an email account associated the user, information obtained from a social networking account associated the user, and/or information identifying an age of the user, an education level of the user, an language preference of the user, a gender of the user, a physical handicap associated with the user, and/or a geographical location of the user.

In some implementations, the node identified by the matching edge is associated with a first complexity level, the current node is associated with a second complexity level, and the first complexity level is higher than the second complexity level. In some implementations, the node identified by the matching edge is associated with a first reward for completion, the current node is associated with a second reward for completion, and the first reward for completion is higher than the second reward for completion.

In some implementations, the computing device is attached to the user's head, is a mobile device, is a computing cloud-enabled device, and/or is an Internet-enabled device. In some implementations, the computing device is connected with the Internet using one of: a cellar network connection, a wireless connection, a Bluetooth connection, and an infrared connection.

In some implementations, the video game is a shooting game. In such implementations, edges in the hierarchical data structure collectively include a plurality of head movements. Here, the plurality of head movements comprises a first head movement associated with an aiming action, a second head movement associated with a firing action, a third head movement associated with a loading action, and a fourth head movement associated with a moving action.

In some implementations, the video game is a first-person shooting game. In such implementations, edges in the hierarchical data structure collectively include a plurality of head movements. Here, the plurality of head movements comprises a first head movement associated with an aiming action, a second head movement associated with a firing action, a third head movement associated with a loading action, and a fourth head movement associated with a moving action.

In some implementations, the video game is a racing game. In such implementations, the edges in the hierarchical data structure collectively include a plurality of head movements. Here, the plurality of head movements comprises a first head movement associated with an accelerating action, a second head movement associated with a braking action; a third head movement associated with a de-accelerating (e.g., stopping) action; and a fourth head movement associated with a turning action.

In some implementations, the video game is a role-playing game. In such implementations, the edges in the hierarchical data structure collectively include a plurality of head movements. Here, the plurality of head movements comprises a first head movement associated with a moving action, a second head movement associated with a gesturing action, and a third head movement associated with a conversing action with another user in the video game.

In some implementations, the video game is a virtual reality game. In such implementations, the edges in the hierarchical data structure collectively include a plurality of head movements. Here, the plurality of head movements comprises a first head movement associated with dressing up an avatar, a second head movement associated with moving the avatar, a third head movement associated with assigning a task to the avatar, and a fourth head movement associated with rewarding the avatar for completing the task.

In some implementations, the video game is a zombie game. In such implementations, the edges in the hierarchical data structure collectively include a plurality of head movements. Here, the plurality of head movements comprises a first head movement associated with approaching a zombie, a second head movement associated with moving away from a zombie, and a third head movement associated with attacking a zombie.

In other aspects of the present disclosure, computing systems and non-transitory computer storage mediums for executing one or more steps of any of the above-described methods are also disclosed.

BRIEF DESCRIPTION OF THE DRAWINGS

The implementations disclosed herein are illustrated by way of example, and not by way of limitation, in the figures of the accompanying drawings. Like reference numerals refer to corresponding parts throughout the drawings.

DETAILED DESCRIPTION

The implementations described herein provide various technical solutions to improving user experience (e.g., more smooth human computer interaction, and more intuitive user interface) in video games, and in particular to the above-identified problems, by providing techniques for providing an interactive hands-free video game tutorial.

Additional details of implementations are now described in relation to the Figures.

Figure 1:
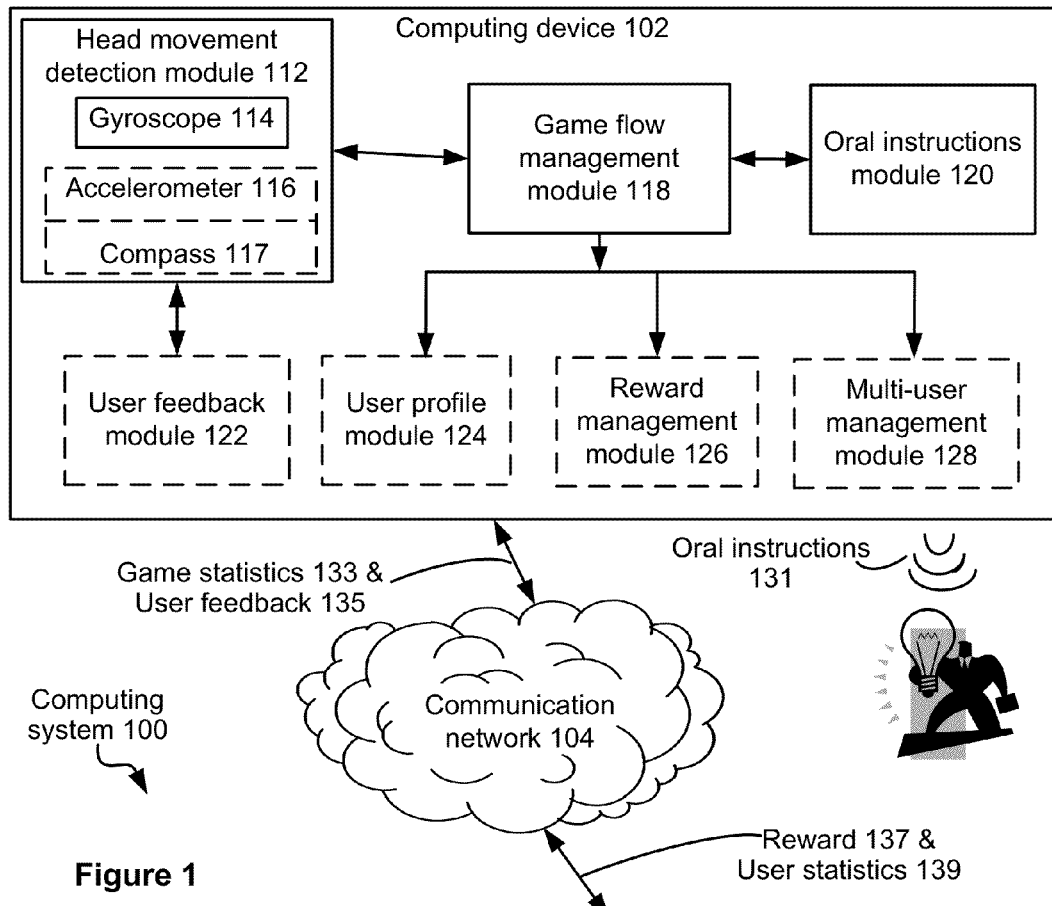
FIG. 1 is an example block diagram illustrating a computing system, in accordance with some implementations of the present disclosure.
Figure 1:
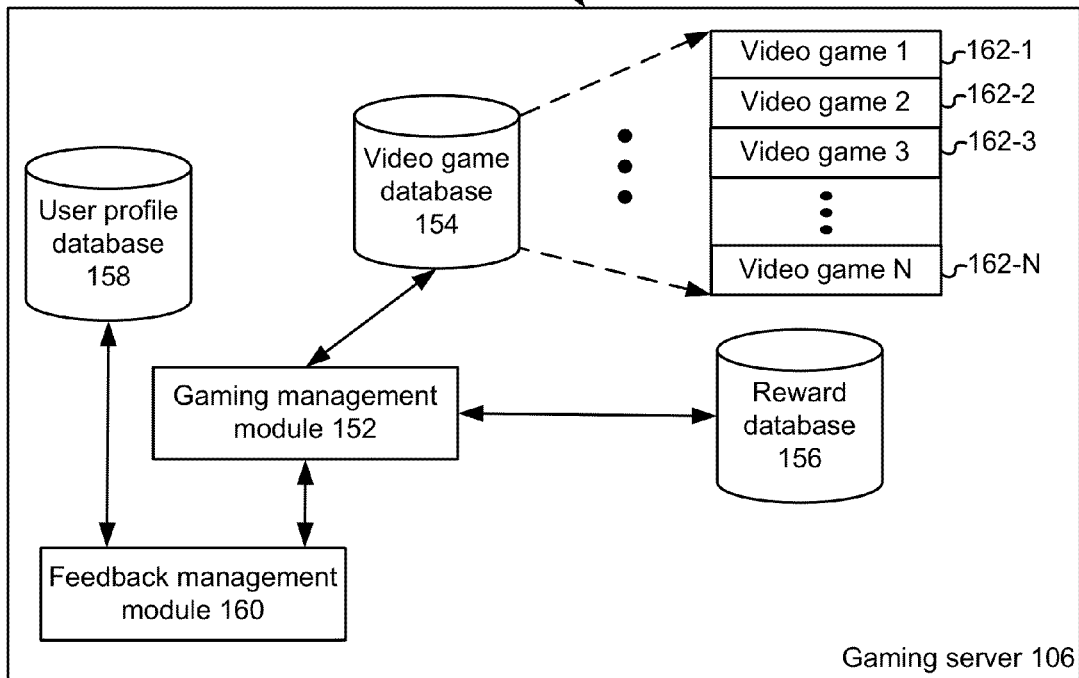

FIG. 1 is a block diagram illustrating a computing system 100, in accordance with some implementations. In some implementations, the computing system 100 includes one or more computing devices 102 (e.g., computing devices 102A, 102B, 102C, 102D..., and 102N), a communication network 104, and one or more gaming server systems 106. In some implementations, a computing device 102 is a phone (mobile or landline, smart phone or otherwise), a tablet, a computer (mobile or otherwise), or a hands-free computing devices such as a GOOGLE GLASS device.

In some implementations, a computing device 102 senses a user's head movement, and determines whether to advance a user to a next stage of a video game or to forego advancing the user to the next stage of the video game. In some implementations, the computing device 102 outputs oral instructions in accordance with these determinations, such as congratulating a user on the successful completion of the current stage of a game, or to encourage a user to re-attempt a stage of a game when the user did not succeed.

In some implementations, a computing device 102 includes a head movement detection module 112, which includes one or more gyroscopes 114 (e.g., a 3-axis gyroscope), optionally one or more accelerometers 116, and optionally one or more compasses. In some implementations, the computing device 102 also includes a game flow management module 118, an oral instructions module 120, a user feedback module 122, a user profile module 124, a reward management module 126, and a multi-user management module 128.

In some implementations, the head movement detection module 112 senses/detects a user's head movement, for example when the user is playing a video game, by measuring one or more characteristics of the user's head movements, such as a speed associated with the sensed head movement (e.g., via the one or more accelerometers 116), an acceleration associated with the sensed head movement (e.g., via the one or more gyroscopes 114), a degree of the sensed head movement (e.g., via the one or more gyroscopes 114), and a direction of the sensed head movement (e.g., via the one or more gyroscopes 114 and/or compasses 117).

In some implementations, the game flow management module 118 manages gaming flow of a video game. Examples of gaming flow include, determining when to advance a user to a next stage of the video game, when to place the user in a previous stage of the video game (also sometimes called backtracking, such as repeating a past level), when to maintain the user in the current stage of the video game, when to terminate the video game, when to provide an accolade to the user, and/or when to provide the user with an in-game or out of game reward.

In some implementations, the oral instructions module 120, in accordance with the determinations by the game flow management 118, outputs, e.g., via one or more speakers or speaker jacks, various sets of oral instructions to a user, such as congratulating a user for moving to a next stage, encouraging a user after the user has failed to move to a next stage of a game for more than a predefined number of times, providing more detailed or complex instructions to a user in view of a recent attempt to take a predetermined user action in a game (e.g., successful or unsuccessful attempt to accomplish a task or advance a level).

In some implementations, the user feedback module 122 records user feedback to an oral instructions provided, e.g., to analyze effectiveness of such oral instruction. For example, if a user yells out "GOT IT!" after receiving an oral instruction, it is sometimes determined that the oral instruction is effective, and thus is likely to be repeated to the same user or different users facing similar situations. In another example, if a user continues to fail to advance to a particular advanced stage of a game after receiving a certain oral instruction, it is sometimes determined that the oral instruction is ineffective, and thus is less likely to be repeated to the same user or different users facing similar situations, or sometimes not used in future applications.

In some implementations, the user profile module 122 provides and accumulates information about a user, from user's interaction with a video game or from other sources (e.g., a user's information entered into a registered email account). In some implementations, the user profile module 122 provides information to the oral instructions module 120, such that different oral instructions are generated to different users with different profiles, when facing the same stage of a game. For example, in some implementations, for user with college education, more sophisticated instructions regarding target aiming are provided, whereas for users who are still in grade school, simple instructions such as "Point . . . " and "FIRE!" are provided.

In some implementations, the reward management module 126 provides one or more rewards or incentives to a user, e.g., for completing a task, as encouragement for repeating a failed task, for applying a credit (generated by a game publisher or by a peer user), and the like.

In some implementations, the multi-user management module 126 coordinates communications between two or more users, for instance by exchanging gaming status/progress (e.g., game statistics 133) between two users who are both playing a shooting game, exchanging credits and feedback (e.g., user feedback 135) between different users, and initiating an instant messaging chat between two or more users.

In some implementations, the communication network 104 interconnects one or more computing devices 102 with each other, and with the gaming server system 106. In some implementations, the communication network 104 optionally includes the Internet, one or more local area networks (LANs), one or more wide area networks (WANs), other types of networks, or a combination of such networks.

In some implementations, the gaming server system 106 includes a gaming management module 152, a feedback management module 160, a video game database 154, a reward database 156, and a user profile database 158. In some implementations, the video game database 154 includes one or more video games 162. In some implementations, such video games are provided to one or more users of computing devices 102. In some implementations, this distribution of video games 162 is provide to user of computing devices 102 under any number of licensing schemes, such as for a fee, for free with advertisements, or for free without advertisements.

In some implementations, the gaming server system 106 manages a set of gaming applications (e.g., video games), and tracks user activities with respect to each such gaming application. For example, after detecting that a user has completed ten levels in a video game within one hour of game play, the gaming server system 106 flags a user profile for the user to note that the user is a sophisticated user, and recommends video games having similar complexity or sophistication to the user in the future. In another example, after detecting that a user has attempted the same level of a game more than a predetermined number of times (e.g., 100 times) in a predetermined period of time (e.g., the past week), the gaming server system 106 generates a credit and disburses the credit to the user for the user's relentless efforts.

In some implementations, the gaming management module 152 tracks a user's progress or other activities within the video games 162. In some implementations, the feedback management module 160 collects user feedback given explicitly (e.g., a user comment that a game is "fun") or implicitly (e.g., leaving a game one minute after starting it and never returning), and updates the user profile database 158. In some implementations, the video game database 154 stores one or more video games, such as shooting games, zombie games, spelling games, virtual reality games, and role play games.

In some implementations, the reward database 156 stores one or more rewards that can be disbursed to users, such as in-game credits, out-of-game credits (e.g., a coupon), virtual currency applicable to two or more games, virtual currency recognized by a group of users, and/or real currency.

In some implementations, the user profile database 158 stores information about a group of users. Exemplary information includes, but is not limited to user age, educational level, gaming history, purchasing history, language preferences, geographical location, means of communication (e.g., a mobile phone number), and/or residence information.

Figure 2:
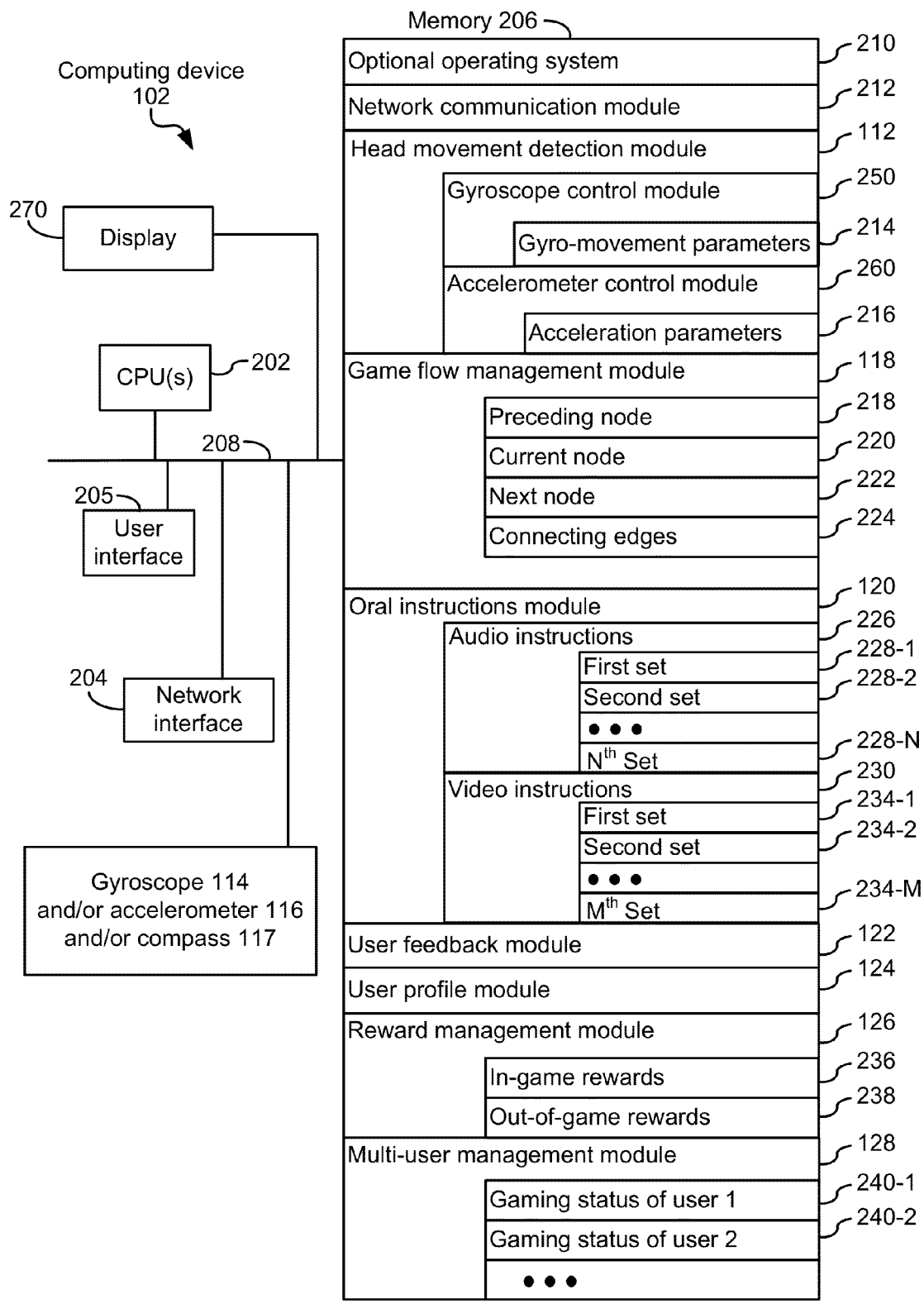
FIG. 2 is an example block diagram illustrating a hands-free computing device, in accordance with some implementations of the present disclosure.

FIG. 2 is a block diagram illustrating a computing device 102 in accordance with some implementations. The computing device 102 in some implementations includes one or more processing units CPU(s) 202 (also referred to as processors), one or more network interfaces 204, a user interface 205, a memory 206, a gyroscope 114, optionally an accelerometer 116, optionally a compass 117, a display 270, and one or more communication buses 208 for interconnecting these components. The communication buses 208 optionally include circuitry (sometimes called a chipset) that interconnects and controls communications between system components. In some implementations the gyroscope 114 is for measuring gyro movement of a user (e.g., the user's head, arm, or leg movement). In some implementations the accelerometer 116 measures speed or acceleration of a user's movement (e.g., the user's head movement).

The memory 206 typically includes high-speed random access memory, such as DRAM, SRAM, DDR RAM or other random access solid state memory devices; and optionally includes non-volatile memory. The memory 206 optionally includes one or more storage devices remotely located from the CPU(s) 202. The memory 206, or alternatively the non-volatile memory device(s) within the memory 206, comprises a non-transitory computer readable storage medium. In some implementations, the memory 206 or alternatively the non-transitory computer readable storage medium stores the following programs, modules and data structures, or a subset thereof:

- optionally, an operating system 210, which includes procedures for handling various basic system services and for performing hardware dependent tasks;
- a network communication module (or instructions) 212 for connecting the computing device 102 with other devices (e.g., the gaming system 106 and the computing devices 102B . . . 102N) via one or more network interfaces 204 (wired or wireless), and/or the communication network 104 (FIG. 1);
- a head movement detection module 112 for sensing one or more characteristics of user head movements, such as detecting whether a user has nodded their heads, whether a user is shaking their heads swiftly or slowly or leaning backwards or forwards, including:
    - a gyroscope control module 250 for identifying (e.g., measuring) one or more gyro-movement parameters of a user's gyro-movement, e.g., how many degrees a user has tilted his/her head to the left, and how many degrees a user has turned his/her head backwards; and
    - an accelerometer control module 260 for identifying (e.g., measuring) one or more acceleration parameters of a user's movement, e.g., how fast a user has tilted his/her head to the left, and how slowly a user has turned his/her head backwards;
- a game flow management module 118 for managing work flow of a video game, in response to a user (e.g., head) movements, including:
    - a preceding node 218 representing a previous (e.g., immediately preceding) stage of a gaming application a user was in;
    - a current node 220 representing the current stage of a gaming application the user is in;
    - one or more next nodes 222 representing one or more next stages of a gaming application the user may advance to from the current node 220; and
    - one or more connecting edges representing one or more respective means (e.g., user head movements) to clear the current stage of the gaming application and move to a next stage of the gaming application;
- an oral instructions module 120 for outputting video and/or audio instructions to a user, in response to user head movements made with respect to the current stage of a gaming application, for example, if an affirmative user head movement (e.g., a yes/no head movement) clears the current stage of a spelling game, the oral instructions module 120 outputs the word "Congratulations!" In some implementations, the oral instructions module 218 outputs:
    - one or more audio instructions 226, for example:
        - a first set of audio instructions 228-1 (e.g., "Please move letter 'L' to the side");
        - a second set of audio instructions 228-2 (e.g., "Please now move letter 'I' to the front"); and
        - an N$^{th}$ second set of audio instructions 228-N (e.g., "Please node your head twice to confirm game completion"); and
    - one or more video instructions 230, for example:
        - a first set of video instructions 232-1 (e.g., displaying a video clip that moves, on a display device a user is looking at, the letter 'L' to the side);
        - a second set of video instructions 232-1 (e.g., displaying a video clip that moves, on a display device a user is looking at, the letter 'I' to the front); and
        - an M$^{th}$ set of video instructions 228-M (e.g., displaying a video clip, on a display device a user is looking at, asking the user to "Please node your head twice to confirm game completion").
- a user feedback module 122 for collecting and identifying user feedback given expressly or impliedly towards a gaming application;
- a user profile module 124 for managing (e.g., recording, tracking, or storing) various information about a user, so as to build a profile of the user, such as a user's education, age, gender, purchasing preferences, and/or gaming history;
- a reward management module 126 for disbursing in-game rewards 236 and out-of-game rewards 238 to a user; and
- a multi-user management module 128 for coordinating gaming progress between multiple users engaging in the same gaming application (e.g., gaming status of user 1 "240-1", gaming status of user 2 "240-2", and so forth), and facilitating the communication between these users (e.g., via an instant messaging application).

In some implementations, the head movement detection module 112 includes a gyroscope control module 250 for sensing user head movements. In some implementations, such user head movements can be parameterized into gyro-movement parameters 214. In some optional implementations, there is also a compass control module for obtaining compass measurements. Examples of gyro-movement head parameters in some implementations include forward 30 degrees, left 10 degrees, north 90 degrees, and south 30 degrees, and so forth. In some implementations, the accelerometer control module 260, like the corresponding accelerometer 116, is optional. In some implementations, the accelerometer control module 260 measures speed or acceleration of user head movements. In some implementations, the measurements of the accelerometer 116 are parameterized by accelerometer control module 260 into one or more acceleration parameters 216 (e.g., forward at 10 cm per second, backwards at 1 cm per second, forwards at 1.5 cm per second, or clockwise continuously, etc.).

In some implementations, the user interface 205 includes an input device (e.g., a button, a microphone, a touch pad, or a camera) for a user to interact with the computing device 102. In some implementations, the gyroscope 114 and/or optional accelerometer 116 and/or compass (not shown) is considered to be part of user interface 205. In some implementations user interface 205 includes a speaker (e.g., one or more bone-conducting transducers).

In some implementations, one or more of the above identified elements are stored in one or more of the previously mentioned memory devices, and correspond to a set of instructions for performing a function described above. The above identified modules or programs (e.g., sets of instructions) need not be implemented as separate software programs, procedures or modules, and thus various subsets of these modules may be combined or otherwise re-arranged in various implementations. In some implementations, the memory 206 optionally stores a subset of the modules and data structures identified above. Furthermore, the memory 206 may store additional modules and data structures not described above.

Figure 14:
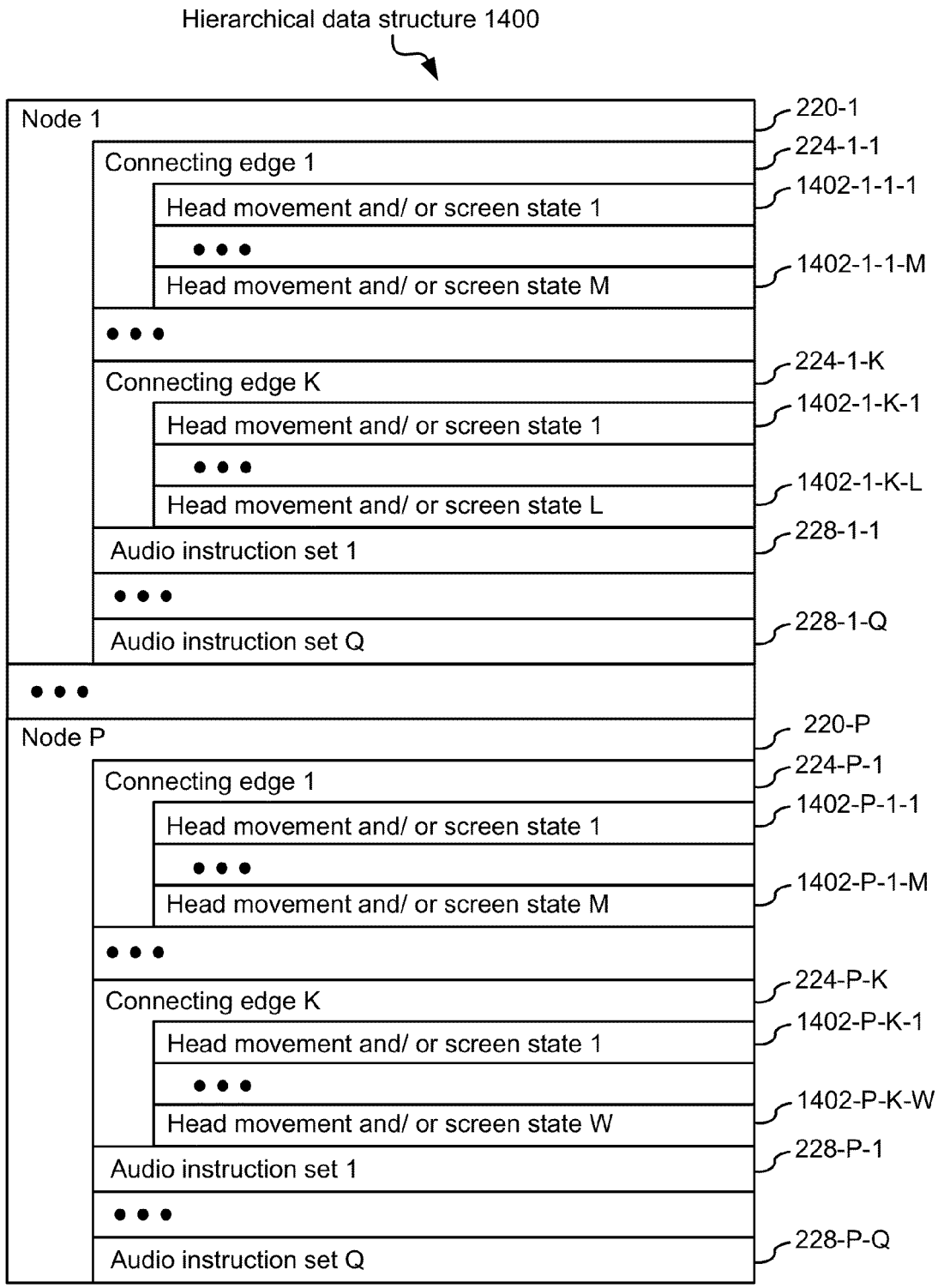
FIG. 14 is an example block diagram illustrating a data structure that stores a hierarchical data structure having a plurality of nodes connected by edges in a plurality of edges in accordance with some implementations of the present disclosure.
Figure 15:
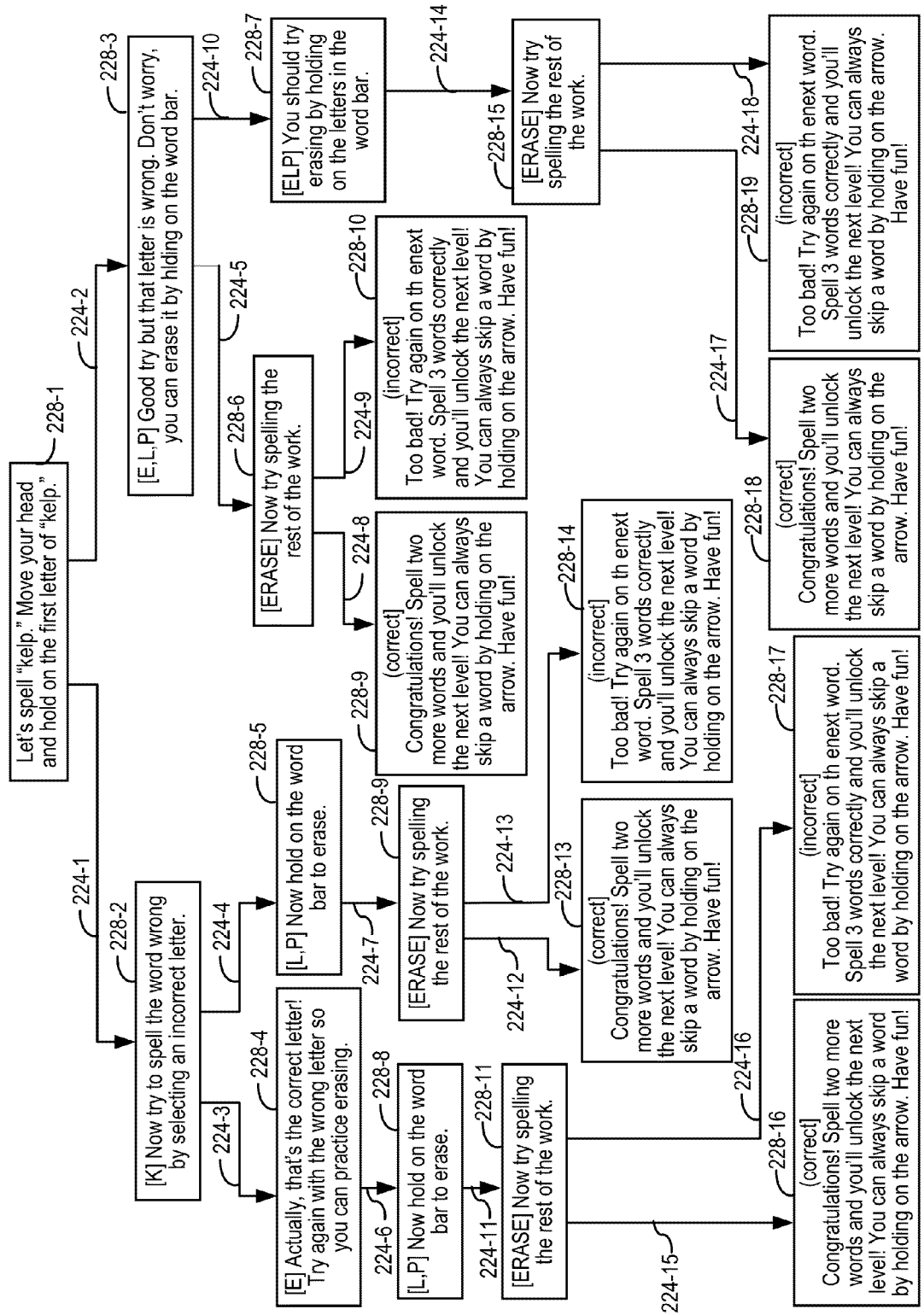
FIG. 15 is an example block diagram illustrating oral instructions associated with each node in a hierarchical hands-free video game tutorial in accordance with an embodiment of the present disclosure.

Game flow management module 118 directs a game tutorial by determining a current node 220 and, based on that and the connecting edges 224 of the current node 220, determining a next node 222 in which to turn over process control in accordance with exemplary process 400 or 500 described below with respective reference to FIGS. 4 and 5. The hierarchical data structure that game flow management module 118 makes use of, in accordance with one embodiment, is described in more detail with reference to FIG. 14 in which an exemplary hierarchical data structure 1400 is displayed. This hierarchical data structure 1400 includes a plurality of nodes 220, and for each respective node 220, one or more connecting edges 224, one or more audio instruction sets 228, and (optionally) one or more video instruction sets 234 (not shown in FIG. 14, see FIG. 2). For each connecting edge 224, there is a next node 222 (not shown in FIG. 14, see FIG. 2), one or more head movements, and/or screen states 1402 that are necessary to achieve the next node 222. FIG. 15 illustrates all the audio instructions sets 228 for one exemplary hierarchical data structure in an exemplary embodiment. In FIG. 15, there is exactly one set of oral instructions 228 for each node and thus each box in FIG. 15 further represents a respective node 220 in the hierarchical data structure 1400. FIG. 15 also illustrates the edges 224 between the nodes corresponding to these audio instructions sets 228 between the various nodes of the data structure.

Figure 3:
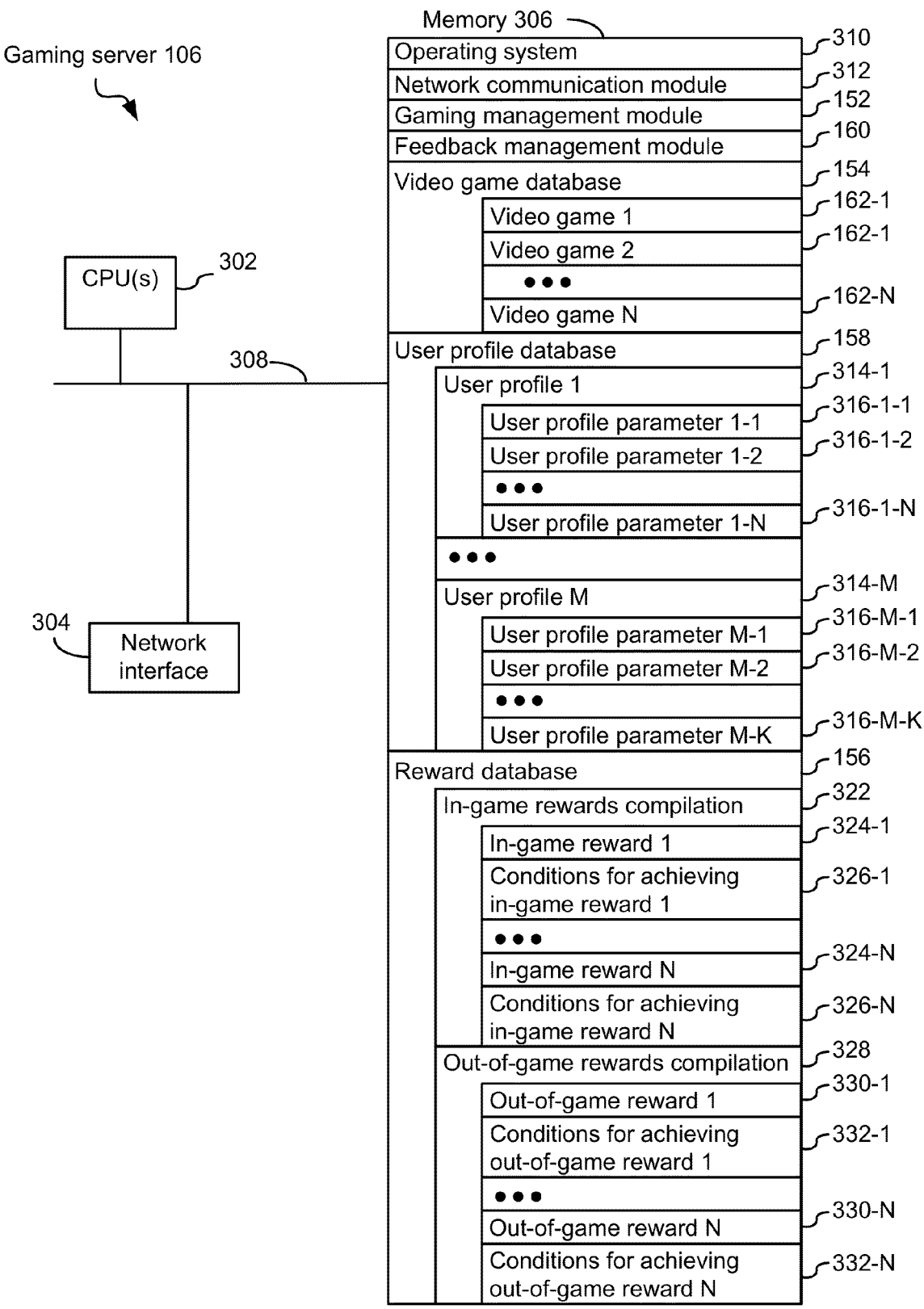
FIG. 3 is an example block diagram illustrating a gaming server system, in accordance with some implementations of the present disclosure.

FIG. 3 is a block diagram illustrating a gaming server system 106 in accordance with some implementations. The gaming server system 106 typically includes one or more processing units CPU(s) 302 (also referred to as processors), one or more network interfaces 304, memory 306, and one or more communication buses 308 for interconnecting these components. The communication buses 308 optionally include circuitry (sometimes called a chipset) that interconnects and controls communications between system components. The memory 306 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. The memory 306 optionally includes one or more storage devices remotely located from CPU(s) 302. The memory 306, or alternatively the non-volatile memory device(s) within the memory 306, comprises a non-transitory computer readable storage medium. In some implementations, the memory 306 or alternatively the non-transitory computer readable storage medium stores the following programs, modules and data structures, or a subset thereof:

- an operating system 310, which includes procedures for handling various basic system services and for performing hardware dependent tasks;
- a network communication module (or instructions) 312 for connecting the gaming server system 106 with other devices (e.g., the computing devices 102) via the one or more network interfaces 304 (wired or wireless), or the communication network 104 (FIG. 1);
- a gaming management module 152 for managing a set of gaming applications (e.g., video games), and tracking user activities within such gaming applications;
- a feedback management module 160 for collecting user feedback given explicitly (e.g., a user comment that a game is "fun" or "HARD") or implicitly (e.g., leaving a game before accomplishing a predetermined period of game play and never returning, or repeating a game level over a predefined number of times despite past successful completions), and updating a user profile database 158 in accordance with the collected user feedback;
- a video game database 154 comprising one or more video games 162 (e.g., a first person shooting game, a zombie game, a word puzzle, and a virtual reality game);
- a user profile database 158 for maintaining a plurality of user profiles 314 about a corresponding plurality of users, each respective user profile 314 in the plurality of user profiles comprising one or more user profile parameters 316 (e.g., age, educational level, gaming history, purchasing history, language preferences, geographical location, means of communication, a mobile phone number, residence information, licensed games, in-game rewards, out-of-game rewards, and current game level in each licensed games, etc.) about a corresponding user in the plurality of users; and
- a reward database 156, for storing one in-game rewards compilations 322 (with a number of in-game rewards 324 and conditions 326 for achieving such awards) and out-of-game rewards compilations 328 (with a number of out-of-game rewards 330 and conditions 332 for achieving such awards), and/or one or more rewards that can be disbursed to game players. Exemplary in-game rewards 324 include: gaming credits, bonus games, bonus game levels, bonus characters, bonus powers, extended game play; and exemplary out-of-game rewards include: discounts, vouchers, coupons, tickets, and monetary awards.

In some implementations, one or more of the above identified elements are stored in one or more of the previously mentioned memory devices, and correspond to a set of instructions for performing a function described above. The above identified modules or programs (e.g., sets of instructions) need not be implemented as separate software programs, procedures or modules, and thus various subsets of these modules may be combined or otherwise re-arranged in various implementations. In some implementations, the memory 306 optionally stores a subset of the modules and data structures identified above. Furthermore, the memory 306 may store additional modules and data structures not described above.

Although FIGS. 2 and 3 show a "computing device 102" and a "gaming server system 106," respectively, FIGS. 2 and 3 are intended more as functional description of the various features which may be present in computer systems than as a structural schematic of the implementations described herein. In practice, and as recognized by those of ordinary skill in the art, items shown separately could be combined and some items could be separated.

Figure 4:
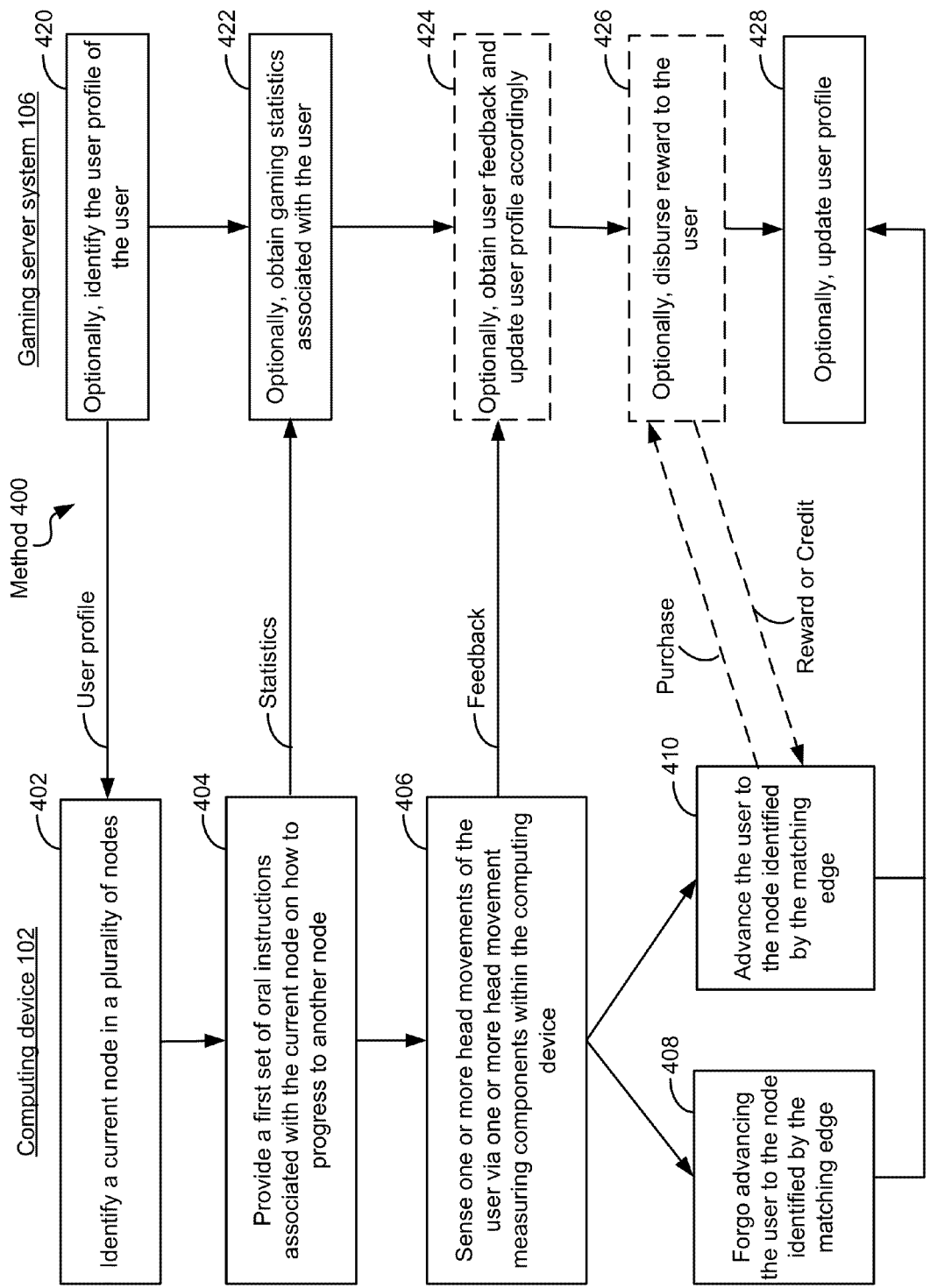
FIG. 4 is an example flow chart illustrating a method for providing an interactive hands-free video game tutorial in a computing system, in accordance with some implementations of the present disclosure.

FIG. 4 is a flowchart illustrating a method 400 for providing an interactive hands-free video game tutorial for a game in a computing system, e.g., implemented at computing device 102, optionally making use of the resources provided by gaming server system 106, in accordance with some implementations. Although FIG. 4 and preceding system diagrams provide a gaming server system 106, it will be appreciated that some methods of the present disclosure can be practiced without any requirement of a gaming server 106 once a tutorial and gaming application have been installed on a computing device 102.

In some implementations, the computing device 102 identifies (402) a current node in a plurality of nodes, e.g., identifying a current stage (in which a user is currently engaged) of a video game that includes two or more stages. In some implementations, the tutorial is characterized by a hierarchical data structure having a plurality of nodes connected by edges in a plurality of edges. Each node in the plurality of nodes represents (i) a game stage in the first video game, and (ii) a set of oral instructions on how to progress to another node in the plurality of nodes. Thus, in step 402, because each node represents a stage in a video game, identification of the current node necessarily identifies the current stage of the game. In some implementations, the plurality of nodes only represents a subset of the possible stages of the game, and that is all that is covered by the tutorial. In some implementations, the method 400 is initiated during the first time a user uses the corresponding video game and/or invokes the tutorial for the game. In implementations where the tutorial is invoked the first time the user uses a game, identification of the current node in the plurality of nodes of step 402 simply involves noting that the tutorial is being run before the user has ever played the game.

In some implementations, each edge in the plurality of edges represents one or more head movements necessary to move from one node to another node in the plurality of nodes. While reference is made to formal nodes and edges of a hierarchical data structure, it will be appreciated that any data structure and bookkeeping technique that track a plurality of stages and the requirements for traversing from one stage to other stages in the plurality of stages will work with the present disclosure; and that hierarchical data structures comprising a plurality of node connected by edges in a plurality of edges encompasses all such data structures and bookkeeping techniques.

In some implementations, the gaming server system 106 identifies (420) a user profile associated with the user, e.g., to provide customized user experience to the user in a video game.

In some implementations, the computing device 102 then provides (404), to the user of a computing device 102, a first set of oral instructions associated with the current node on how to progress to another node of a multi-node video game.

In some implementations, optionally, the gaming server system 106 obtains (422) gaming statistics from the computing device 102, once oral instructions are provided, such as detecting whether a user takes any action within a predefined time interval, e.g., 2 seconds, of receiving the oral instruction, which indicates that a user is sophisticated or experienced.

In some implementations, the computing device 102 senses (406) one or more head movements of the user via one or more head movement measuring components (e.g., the gyroscope 114, the accelerometer 116, the compass 117 etc.) within the computing device 102. The identity of the current node and the sensed one or more head movements is matched to the one or more edges associated with the current node. In some implementations, this matching comprises comparing the one or more sensed head movements to the head movements associated with each edge in the one or more edges.

Optionally, in some implementations, the gaming server system 106 obtains (424) user feedback, based user head movements or other actions, e.g., verbal statements (via a microphone), facial expressions (via a camera) etc. and updates the user profile with this feedback information.

In some implementations, the computing device 102 foregoes (408) advancement of the user to another node when a determination is made that the sensed one or more head movements do not correspond to the one or more head movements of any of the one or more edges associated with the current node. In some implementations, the computing device 102 causes the user to be advanced (410) to a node identified by the matching edge when a determination is made that the sensed one or more head movements corresponds to the one or more head movements of an edge in the one or more edges associated with the current node.

Optionally, in some implementations, the gaming server system 106 disburses (426) rewards to the user in accordance with one or more actions by the user within the video game, such as purchasing a gaming credit, successfully completing a stage/task, and so forth.

Figure 5:
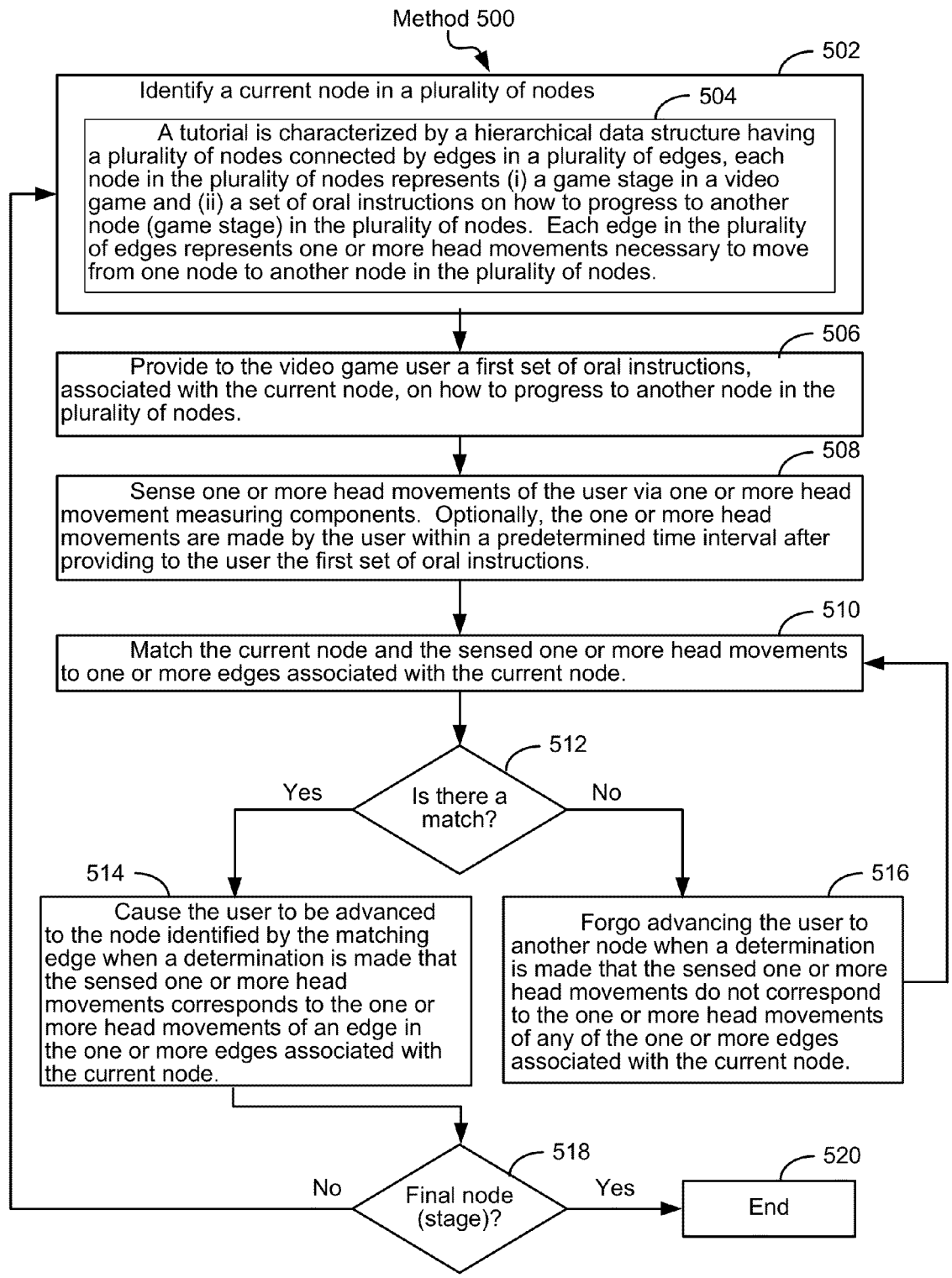
FIG. 5 is an example flow chart illustrating methods for providing an interactive hands-free video game tutorial, in accordance with some implementations of the present disclosure.

FIG. 5 is an example flow chart illustrating a method 500 for providing a tutorial for a video game, in accordance with some implementations. In some implementations, the video game is a spelling game for words or phrases. In some implementations, the video game is a hunting game (e.g., the DEER HUNTER game by the GLU MOBILE INC., San Francisco, Calif., a first person shooting game (FPS), a virtual reality game (VR), a role-playing game (RPG), a spelling game (e.g., the SPELLISTA game by the GLU MOBILE INC., a zombie game, or a puzzle game.

FIG. 5 is described in conjunction with FIGS. 6-13, which provide screen images showing an example user interface for providing an interactive hands-free video game tutorial, in accordance with some implementations. In some implementations, the method 500 is performed at a computing system, e.g., the computing device 102. In some implementations, the computing device 102 includes one or more processors and memory storing one or more programs for execution by the one or more processors. In some implementations, the computing device 102 includes a sometime called client-side device. In some implementations, the computing device 102 is a GOOGLE GLASS device, a smart phone (e.g., a GOOGLE ANDROID phone), a mobile computer (e.g., a GOOGLE NEXUS computer, a laptop, or a notebook), a tablet computer, or a desktop computer. In some implementations, the computing device 102 is attached to the user's head, is a mobile device, is a computing cloud-enabled device, and/or is an Internet-enabled device. In some implementations, the computing device 102 is connected with the Internet using one of the following connections: a cellar network connection, a wireless connection, a Bluetooth connection, and an infrared connection.

In some implementations, as part of initiation of the tutorial (502), a current node in a plurality of nodes is identified. The tutorial (504) is characterized by a hierarchical data structure having a plurality of nodes connected by edges in a plurality of edges. Each node in the plurality of nodes represents (i) a game stage in a video game and (ii) a set of oral instructions on how to progress to another node (game stage) in the plurality of nodes. Each edge in the plurality of edges represents one or more head movements necessary to move from one node to another node in the plurality of nodes. In some implementations, the method is performed at a computing device having one or more processors and memory storing (i) one or more programs for execution by the one or more processors, (ii) the hierarchical data structure, and (iii) instructions for executing the video game.

In some implementations, the method 500 is invoked because it is the first time a user has used the subject video game, and thus training is necessary to learn the rules of the game. In other implementations, the user has, implicitly or explicitly, requested help. In some implementations, the tutorial always begins at a predetermined node regardless of the state of the game prior to invoking the tutorial. In some implementations, the tutorial is responsive to the state of the game and selects from among the plurality of nodes of the tutorial based upon the stage of the game the user was in when the tutorial was invoked. It will be appreciated herein that because each node in the tutorial represents a different stage of the game, reference to nodes as stages of the game is made. However, although the tutorial is meant to instruct a user on the rules of the game, the tutorial, in typical implementations, does not encompass every possible stage of the game.

Figure 6:
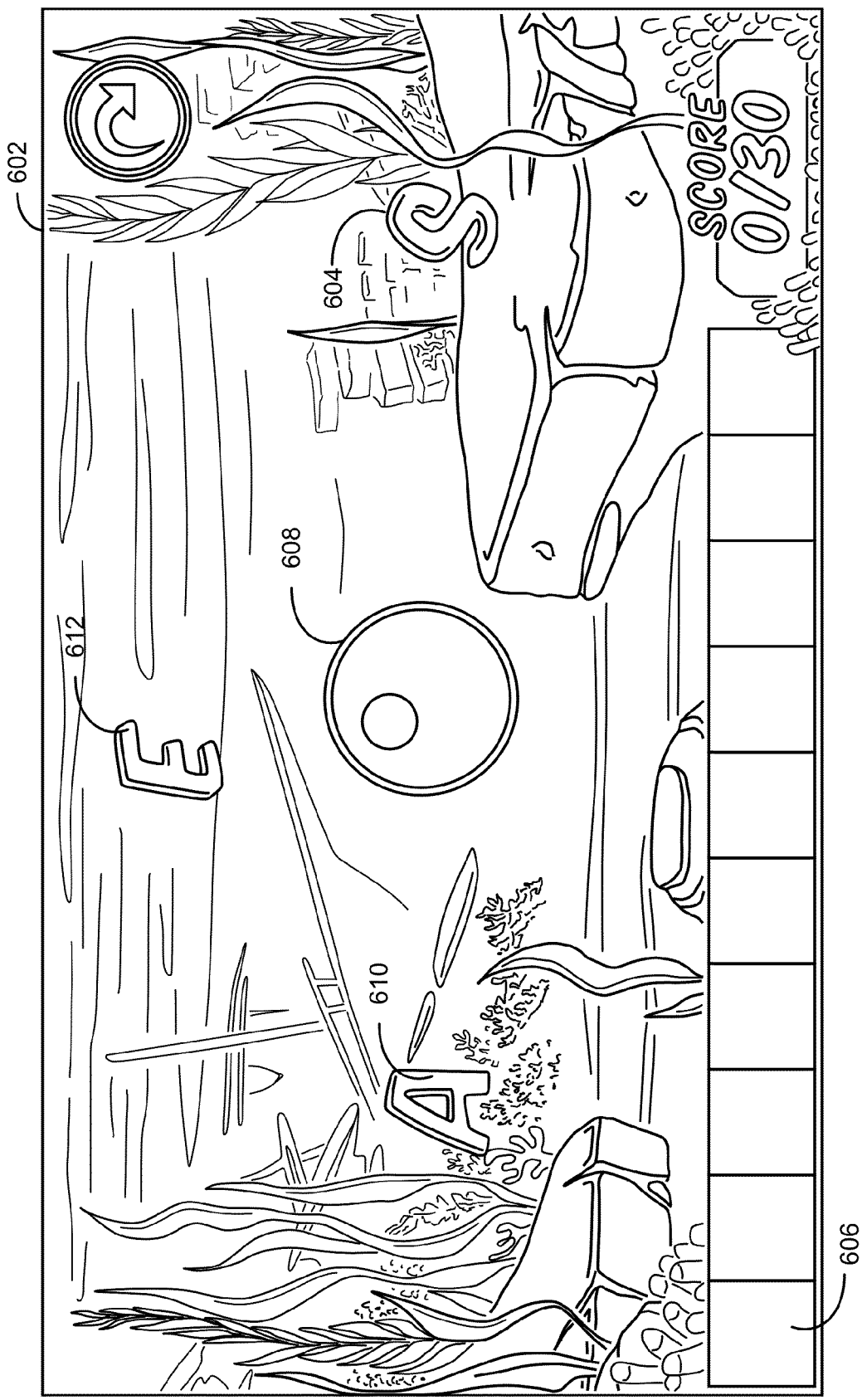
FIGS. 6-13 are example screen images showing progressive advancement to various nodes in a hierarchical hands-free video game tutorial, in accordance with some implementations of the present disclosure.
Figure 7:
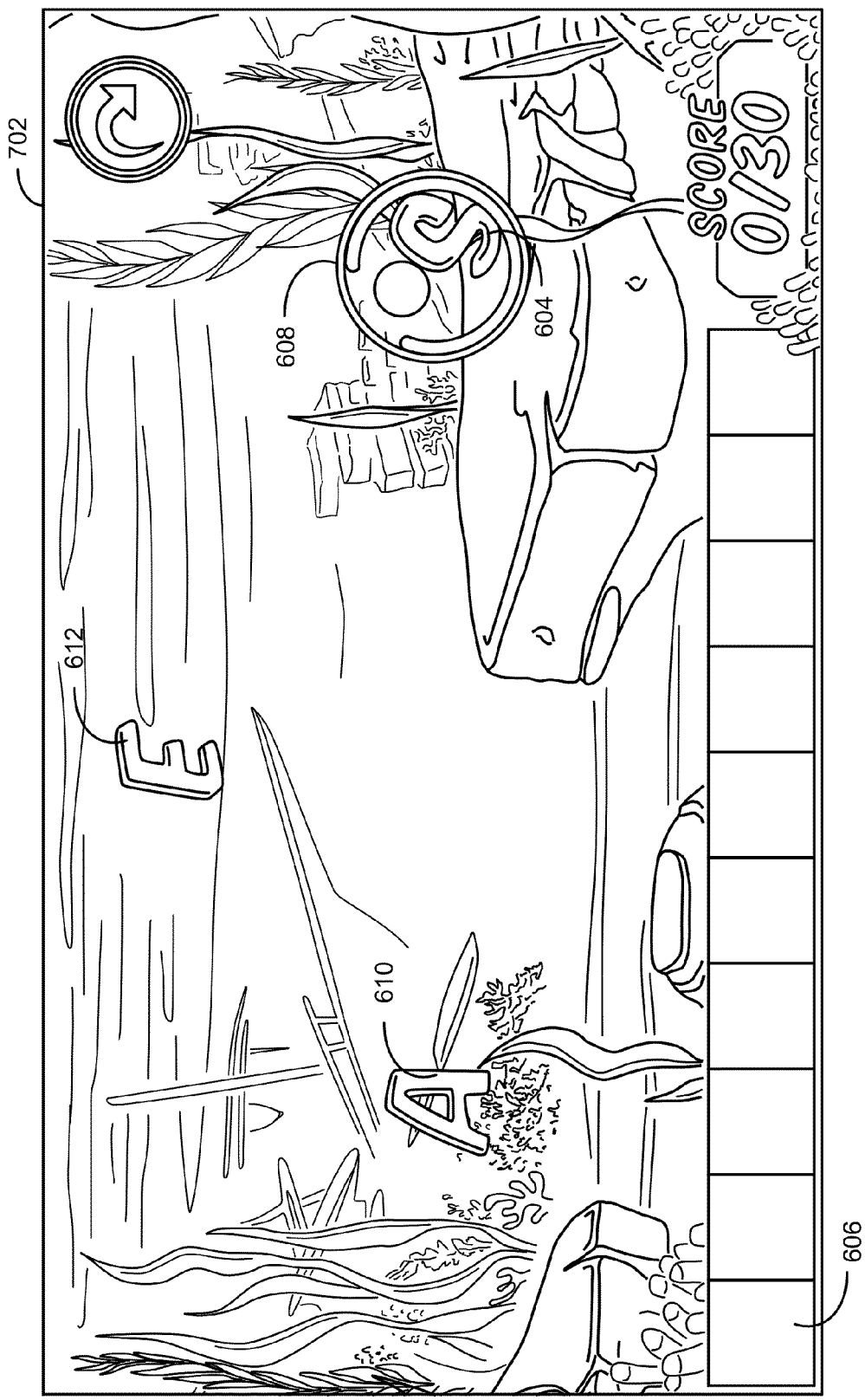

In step 506, a first set of oral instructions, associated with the current node, on how to progress to another node in the plurality of nodes is provided to the video game user, as illustrated in FIG. 6. For example, FIG. 6 illustrates a node 602 in a plurality of nodes. The node (game stage) is reached when a user has requested the tutorial. In some implementations it is reached the first time a user tries to use the subject game. In the example shown in FIG. 6, a first set of oral instructions associated with the node illustrated in FIG. 6 are provided (e.g., "Let's spell 'sea.' Move your head and hold on the first letter of "sea.""). In some implementations, the first set of oral instructions includes audio instructions provided to the user via an audio output device associated with the computing device. In some implementations, the first set of oral instructions includes video instruction provided to the user via a video output device associated with the computing device.

In the exemplary implementation illustrated in FIG. 6, responsive to these oral instructions, the user must use head movements to select "S" 604 and drag the "S" to the bottom 606 of the display in order to form the first letter (e.g., the letter "S") of the word (e.g., the word "SEA," case sensitive or otherwise). Responsive to this voice narrative, the user makes head movements and learns which head movements will comply with the voice narrative's directive.

For instance, using head movements, the user discovers that bubble 608 is responsive to head movements. The computing device worn by the user senses one or more head movements of the user (508) via one or more head movement measuring components of the computing device. In some implementations, the one or more head movement measuring components includes, as shown in FIG. 1, a gyroscope 114, an accelerometer 116, or a compass 117. In some implementations, the one or more head movements are made by the user within a predetermined time interval (e.g., within ten seconds, within thirty seconds, within one minute, within five minutes, etc.) after the first set of oral instructions is provided to the user, such that the one or more head movements are deemed responsive to the first set of oral instructions.

In FIG. 6, the intent is for the user to drag bubble 608 onto "S" 604 and then drag the bubble, coupled to the character, down to the bottom 606 of the screen. In some implementations, once the user drags bubble 608 onto "S" 604, system drags the bubble, coupled to the character, down to the bottom 606 of the screen automatically without further human intervention. In some implementations, the predetermined time interval within which the one or more head movements are made by the user after being provided the first set of oral instructions is determined in accordance with a profile associated with the user. In some implementations, the profile associated with the user includes information obtained from an email account (e.g., a GMAIL account) associated the user, information obtained from a social networking account (e.g., an FACE BOOK account) associated the user, and/or information identifying one of: an age of the user, an education level of the user, an language preference of the user, a gender of the user, a physical handicap associated with the user, and a geographical location of the user and/or other characteristics of the user.

In some implementations, the user is provided a second set of oral instructions, associated with the current node, on how to progress to another node in the plurality of nodes. For example, the computing device 102 worn by the user may determine that the user is having substantial difficulty advancing to another node. In such instance, the user may provide more detailed oral instructions or may, for example, provide directions on how to perform corrective/remedial action. In some implementations, the second set of oral instructions is more detailed or provides a hint. In some implementations, the second set of oral instructions is only provided after the user has made an in-game purchase. In some implementations, the first set of oral instructions and the second set of oral instructions are the same. For example, the same instructions are repeated to a user, after the user failed to make a correct head movement that would have advance the user to a next state or stage of the tutorial. In some implementations, the first set of oral instructions is distinct from the second set of oral instructions. For example, the second set of instructions includes more information about how to advance to a next stage of the tutorial, in view of a user's recent unsuccessful attempt to do so. In some implementations, the first set of oral instructions includes audio instruction only, and the second set of oral instructions includes both audio and video instruction. For example, the second set of instructions includes a video demo of how to advance to a next stage of the tutorial, in view of a user's recent unsuccessful attempt to do so. In some implementations, the first set of oral instructions is associated with a first length, the second set of oral instructions is associated with a second length, and the second length is greater than the first length. For example, the first set of instructions is more concise than the second set. For example, the second set of instructions is longer or given slower than the first set on how to advance to a next stage of the tutorial, in view of a user's recent unsuccessful attempt to do so. In some implementations, the first set of oral instructions is associated with a first detail level, the second set of oral instructions is associated with a second detail level, and the second detail level is greater than the first detail level. For example, the first set of instructions is more concise than the second set. In other examples, the second set of instructions is longer than the first set on how to advance to a next stage of the game, in view of a user's recent unsuccessful attempt to do so. In some implementations, the second set of oral instructions is selected from a pool (e.g., set or group) of instructions including different sets of oral instructions. For example, the first set of instructions is randomly selected from a pool of instructions suitable for providing to a user, e.g., so as to minimize repetition of prior instructions and thus to retain user interest. In some implementations, the second set of oral instructions is selected from a pool of instructions in accordance with prior instruction to the user. For example, the first set of instructions is repeated if a user says "what?" or "Pardon?" after receiving the first set of instruction. In another example, a different set of instructions is given if a user says "That's not helpful" after receiving the first set of instruction. In some implementations, the second set of oral instructions does not overlap with any prior instructions to the user. For example, no instructions are repeated once they are provided to a user, e.g., to maintain user interest. In some implementations, the second set of instructions is identified from a head movement of an edge in the one or more edges. In some implementations, the second set of instructions is identified from an identity of the current node and an identity of a head movement in the sensed one or more head movements. For example, in such implementations, the second set of instructions is tailored to the current stage of the video game and an action a user has recently taken, so as to provide an individualized user experience.

As FIG. 6 illustrates, there are a number of movements that the user could make that are incorrect and a number of movements that are correct. To successfully advance to the next node (e.g., the next stage of the game), the user needs to move bubble 608 onto the character "S." In other words, to advance to the next node, the stage of the tutorial where the character "S" has been trapped by bubble 608, the user must make head movements that will cause the bubble to move over to the "S". The set of head movements that will accomplish this can be termed an edge, because these head movements connect two nodes, the first node being illustrated in FIG. 6 and the second node being illustrated as state 702 in FIG. 7 in which the bubble 608 is now trapping the "S." There are several head movements that will accomplish the wrong task, such as moving the bubble 608 to the character "A" 610. Thus, in some implementations, the method further includes matching (510) the current node and the sensed one or more head movements to one or more edges associated with the current node. The matching comprises: comparing the one or more sensed head movements to the head movements associated with each edge in the one or more edges. It will be appreciated that any number of head movements may be made to cause bubble 608 to move over to character "A". Thus, in some implementations, a match between the head movements necessary to traverse the edge between node 602 (FIG. 6) and node 702 (FIG. 7) is deemed to match when bubble 608 overlays "S" 604 before hitting characters "A" 610 or "E" 612. In some implementations, the comparing the one or more sensed head movements to the head movements associated with each edge in the one or more edges comprises comparing a position of a first element (e.g., bubble 608) on the display of the computing device to a target position for each respective edge in the one or more edges (e.g., edge 1—bubble 608 placed on the "A" 610, edge 2—bubble 608 placed on the "E" 612, and edge 3—bubble 608 placed on the "S" 604), where the position of the first element on the screen is controlled by the sensed one or more head movements of the user.

In some implementations, comparing the one or more sensed head movements to the head movements associated with each edge in the one or more edges includes comparing one or more characteristics of a sensed head movement in the one or more sensed head movements with one or more characteristics associated with head movements associated with an edge in the one or more edges. In some implementations, the one or more characteristics of the sensed head movement is, alone or in combination, any of: a speed associated with the sensed head movement, an acceleration associated with the sensed head movement, a degree of the sensed head movement, and a direction of the sensed head movement. In some implementations, the node identified by the matching edge is associated with a first complexity level, the current node is associated with a second complexity level, and the first complexity level is higher than the second complexity level. For instance, a game becomes more complex (e.g., with more difficult tasks and/or less time to complete these tasks) once a player advanced to a next stage of the game. In some implementations, the node identified by the matching edge is associated with a first reward for completion, the current node is associated with a second reward for completion, and the first reward for completion is higher than the second reward for completion. For instance, potential reward to a game player is higher once the player advanced to a next stage of the game.

Figure 8:
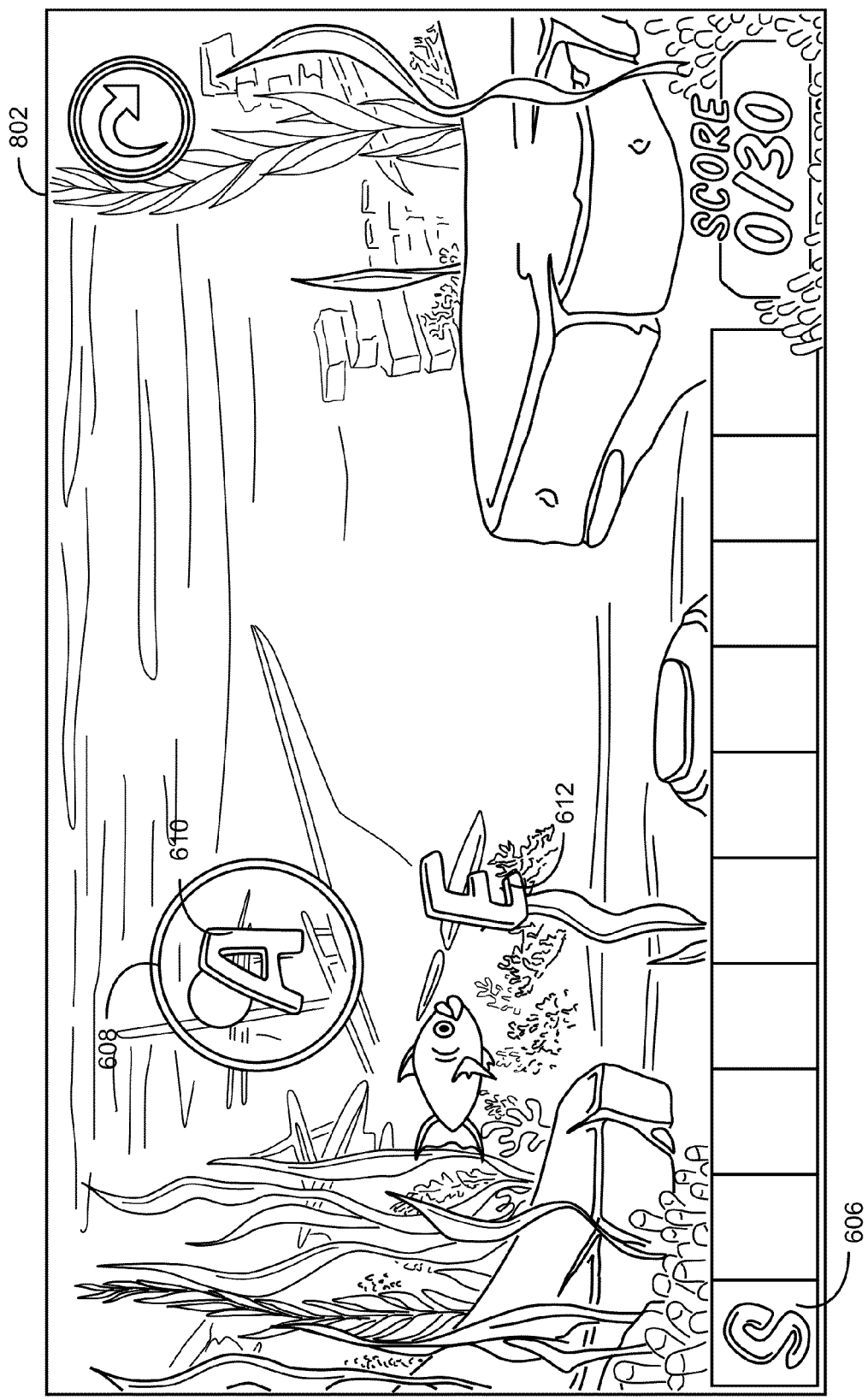

Thus, in step 512, a question is asked whether there is a match in the one or more head movements of the user and an edge associated with node 602. For example, a determination is made as to whether the user moved bubble 608 to "S" 604" before hitting "A" 610 or "E" 612 with bubble 608. If there is a match (512—Yes), the user is advanced (514) to the node identified by the matching edge. For example, the user is advanced to node 702 illustrated by FIG. 7, optionally congratulated on picking the correct letter, and told to move the letter to position 606, as illustrated by FIG. 8. In some implementations, the node identified by the matching edge is connected with the current node by two or more edges. For example, in some cases, a user can clear a current stage of the video game tutorial via two or three different ways, e.g., head movements. For example, after placing the letter "A" at first potation at the bottom of the screen, a player of the game illustrated in FIGS. 6-13 can advance to a next stage of the game by either placing the letter "E" at the second position at the bottom of the screen (e.g., "SE_") or placing the letter "A" at the third position at the bottom of the screen (e.g., S_A).

In some implementations, a respective edge in the two or more edges represents a distinct head movement that is necessary to move from the current node to the node identified by the matching edge. In some implementations, a respective edge in the two or more edges represents a display state that is achieved by any of a number of different head movements (e.g., using bubble 608 to drag "S" 604 to the bottom of the screen 606. In some implementations, a respective edge in the two or more edges is associated with a reward to the user for progressing from the current node to the node identified by the matching edge. In some implementations, the reward is an in-game reward, e.g., crediting for purchasing/unlocking a bonus game within a video game tutorial. In some implementations, the in-game reward is a virtual currency within the first video game. In some implementations, the reward is an out-of-game reward, e.g., a coupon for a purchase independent from the video game tutorial. In some implementations, the out-of-game reward is a promotion for an out-of-game purchase, e.g., a discount for purchasing a gaming station from SONY.COM. In some implementations, the promotion for an out-of-game purchase is one of: a discount for purchasing a second video game, a discount for purchasing merchandize described in the first video game, a discount for purchasing merchandize promoted by a publisher of the first video game, and a discount on an upsell of the first video game.

In the exemplary method 500, if there is no match (512—No), advancement of the user to another node is forgone 516, and process control loops back to step 510. Thus, in some implementations, the forgoing advancing the user to another node comprises maintaining the user at the current node (e.g., looping back to step 510 while maintaining the current node), and optionally reducing a total number of remaining attempts associated with the current node. For example, upon a predefined number of unsuccessful attempts, a user's total allowed number of reattempting the current stage is reduced, e.g., from 4 to 1. In some implementations, however, forgoing advancing the user to another node 516 comprises placing the user at a node in the plurality of nodes that precedes the current node. For example, once a predefined number of unsuccessful attempts, a user is required to repeat a prior level (that the user has already cleared), e.g., to provide additional opportunity to enhance skills.

Figure 9:
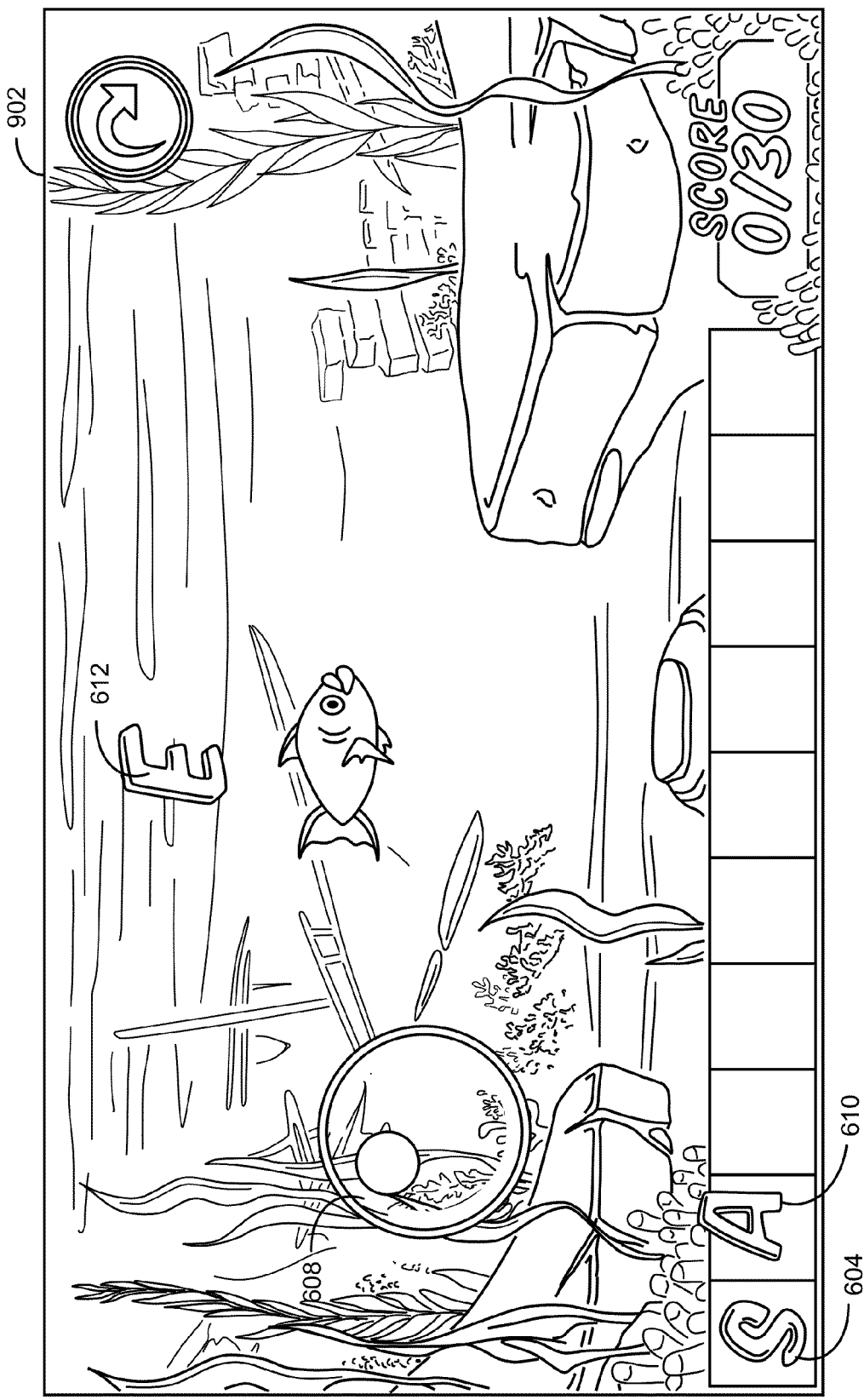
Figure 12:
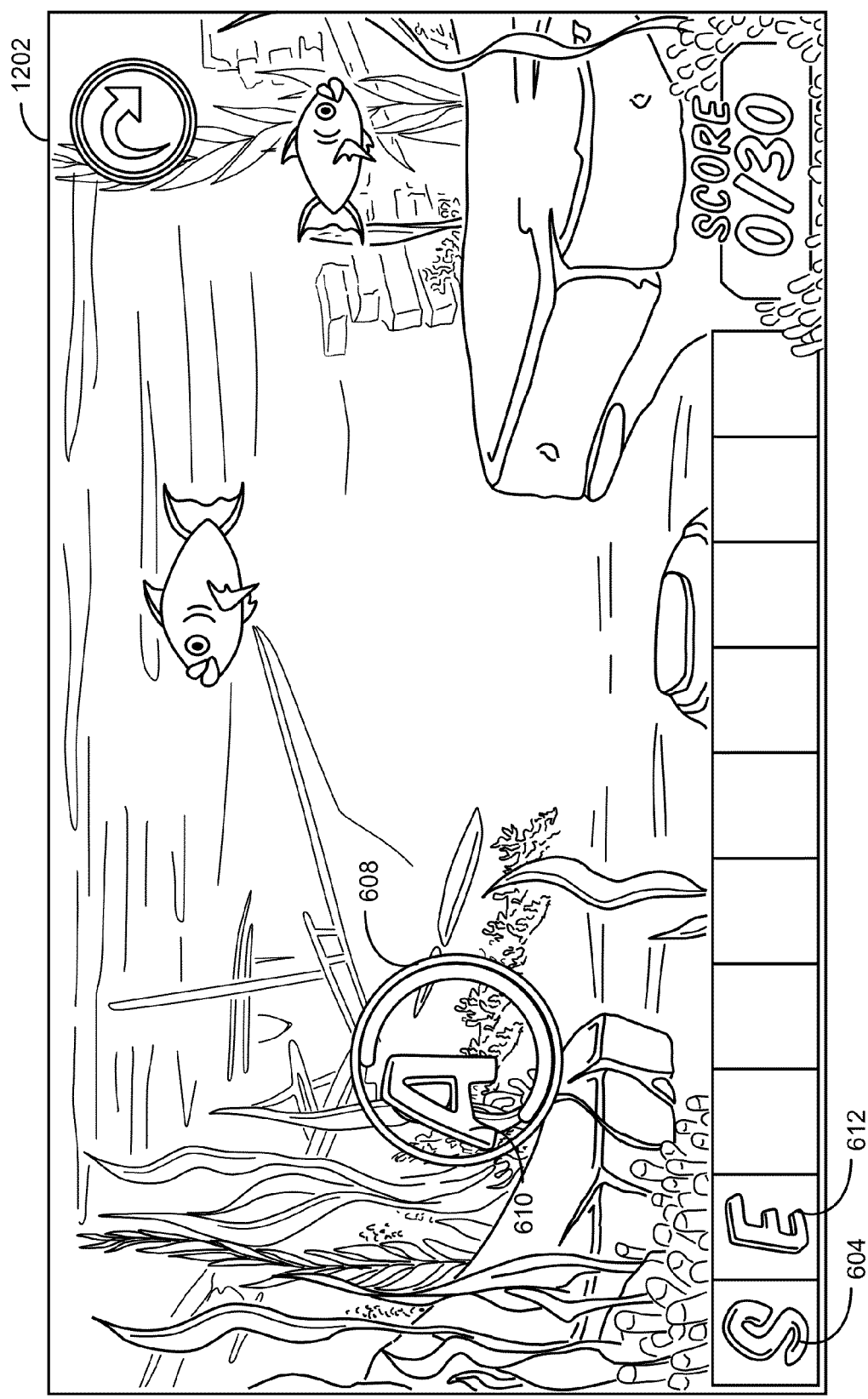
Figure 13:
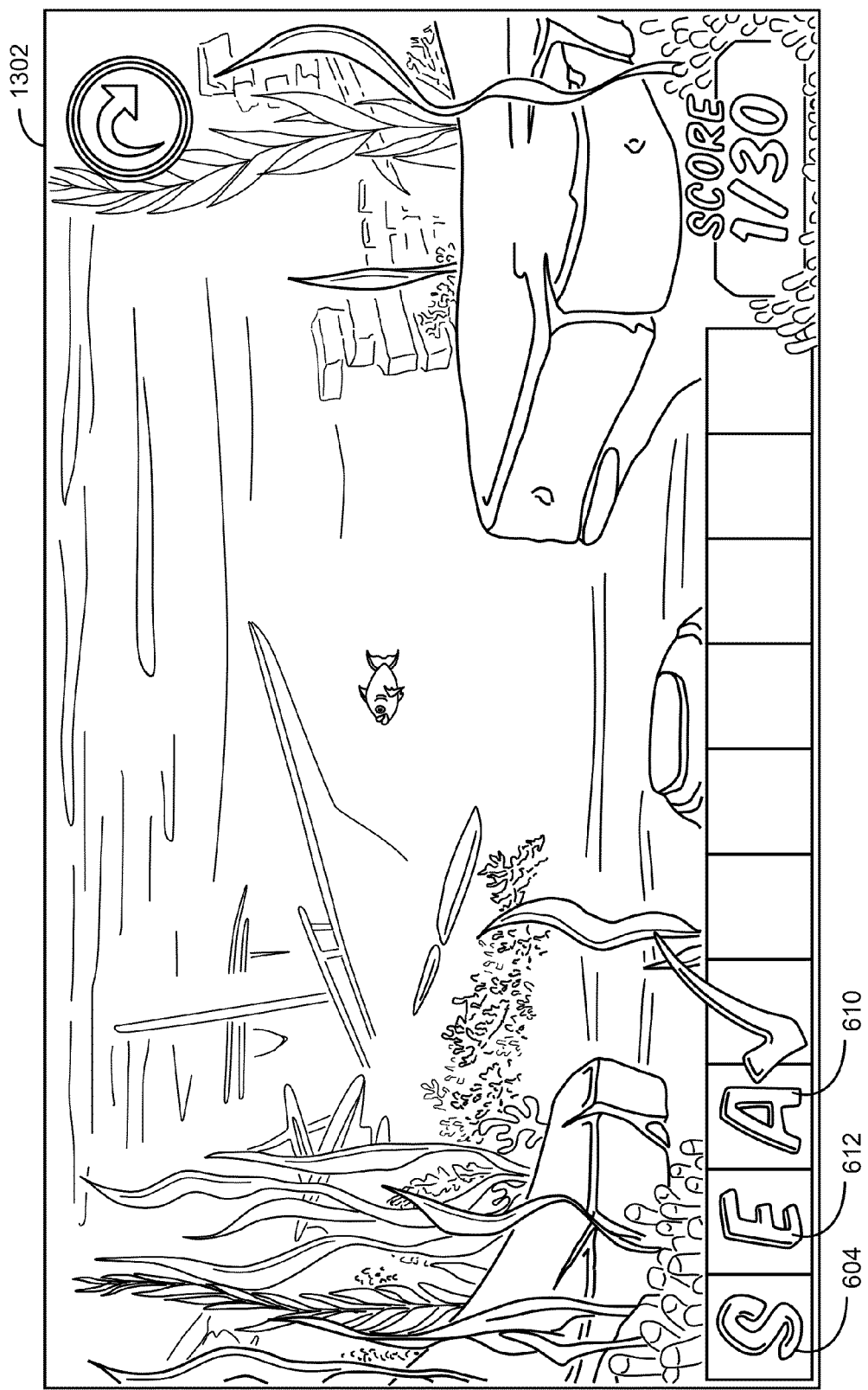

The combination of FIGS. 8, 9, and 12 illustrates how, in some implementations, there are a plurality of edges associated with at least some of the nodes in the plurality of nodes of the tutorial. In FIG. 8, the user has successfully dragged down the first character, "S" 606, of the word "SEA". As such, FIG. 8 illustrates node 802 of the tutorial. In node 902, the user may now use bubble 608 to select "E" 612 or "A" 610, and place it next to "S" 606". The head movements necessary to move "A" 610 next to the "S" 604 represent the head movements associated with one edge associated with node 802, leading to node 902 of FIG. 9 in which the wrong letter "A" 610 has been placed next to "S" 606. The head movements necessary to move "E" 612 next to the "S" represent the head movements associated with another edge associated with node 802, leading to node 1202 of FIG. 12 in which the correct letter "E" 610 has been placed next to "S" 606.

Figure 10:
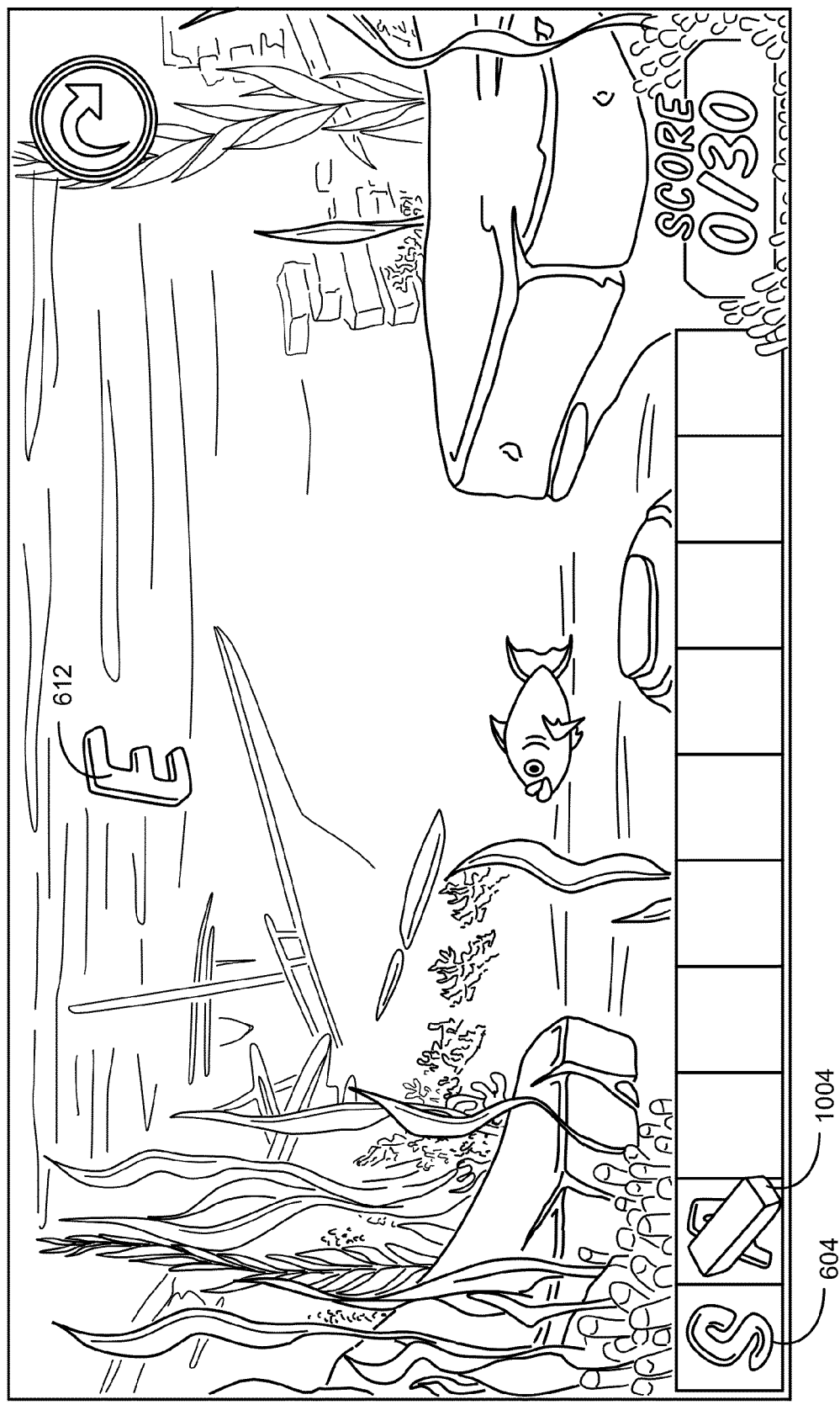
Figure 11:
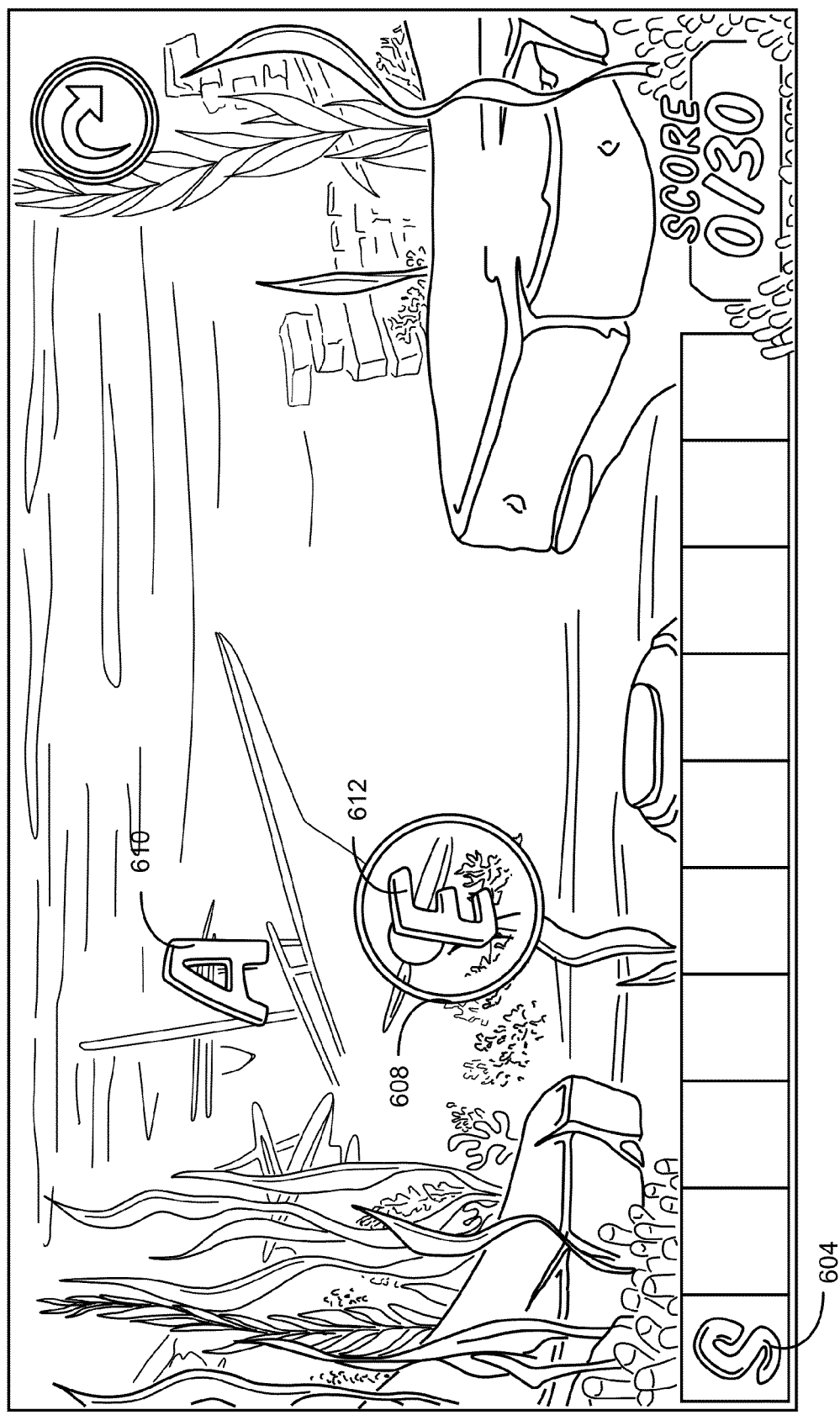

FIGS. 10 and 11 further show the node driven nature of the tutorial, in which the user can take corrective action to achieve a desired advanced node (node 1202) even when the user has advanced to an incorrect node (node 902). As illustrated by scene 1002 of FIG. 10, the user is requested to advance from 9002 by using eraser 1004 to delete the incorrect character, leading to a return to node 902 in FIG. 11, at which point the use uses bubble 612 to obtain the correct character "E" 612, place it next to the "S" 606 and thus advance to node 1202 of FIG. 12.

The cyclic nature of method 500 become evident, with process control advancing to step 518 after completion of step 514 and looping back to step 502 (518—No) until the final node of the tutorial is reached (518—Yes) at which point the process ends 520. For instance, turning to FIG. 13, once the user has dragged "A" 610 to the bottom of the display, the word "SEA" has been spelled, stage 518—Yes is reached, and the process ends 520.

In some implementations, the video game is a word/phrase puzzle game, the edges in the hierarchical data structure collectively include a plurality of head movements, and the plurality of head movements comprises: a first head movement associated with moving a character/word into a particular sequence, a second head movement associated with removing a character/word from a particular sequence, a third head movement associated with moving a character/word from one location to another location (e.g., right upper corner to the left bottom corner), a fourth head movement associated with acknowledge receipt of an oral instruction (a user nodding or shaking their head), and a fifth head movement associated with requesting an oral instruction (a user rotating their head clockwise continuously for 5 seconds).

In some implementations, the video game is a shooting game, the edges in the hierarchical data structure collectively include a plurality of head movements, and the plurality of head movements comprises: a first head movement associated with an aiming action, a second head movement associated with a firing action, a third head movement associated with a loading action, and a fourth head movement associated with a moving action.

In some implementations, the video game is a first-person shooting game, the edges in the hierarchical data structure collectively include a plurality of head movements, and the plurality of head movements comprises a first head movement associated with an aiming action; a second head movement associated with a firing action; a third head movement associated with a loading action; and a fourth head movement associated with a moving action.

In some implementations, the video game is a racing game, the edges in the hierarchical data structure collectively include a plurality of head movements, and the plurality of head movements comprises: a first head movement associated with an accelerating action; a second head movement associated with a braking action; a third head movement associated with a stopping action; and a fourth head movement associated with a turning action.

In some implementations, the video game is a role-playing game, and the edges in the hierarchical data structure collectively include a plurality of head movements, the plurality of head movements comprises: a first head movement associated with a moving action; a second head movement associated with a gesturing action; and a third head movement associated with a conversing action with another user in the video game.

In some implementations, the video game is a virtual reality game, and the edges in the hierarchical data structure collectively include a plurality of head movements, the plurality of head movements comprises: a first head movement associated with dressing up an avatar; a second head movement associated with moving the avatar; a third head movement associated with assigning a task to the avatar; and a fourth head movement associated with rewarding the avatar for completing the task.

In some implementations, the video game is a zombie game, and the edges in the hierarchical data structure collectively include a plurality of head movements, the plurality of head movements comprises: a first head movement associated with approaching a zombie; a second head movement associated with moving away from a zombie; and a third head movement associated with attacking a zombie.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the implementation(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the implementation(s).

It will also be understood that, although the terms "first," "second," etc. may be used herein to describe various elements, these elements should not be limited by these terms. These terms are only used to distinguish one element from another. For example, a first set could be termed a second set, and, similarly, a second set could be termed a first set, without changing the meaning of the description, so long as all occurrences of the "first set" are renamed consistently and all occurrences of the "second set" are renamed consistently. The first set and the second set are both sets, but they are not the same set.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

The foregoing description included example systems, methods, techniques, instruction sequences, and computing machine program products that embody illustrative implementations. For purposes of explanation, numerous specific details were set forth in order to provide an understanding of various implementations of the inventive subject matter. It will be evident, however, to those skilled in the art that implementations of the inventive subject matter may be practiced without these specific details. In general, well-known instruction instances, protocols, structures and techniques have not been shown in detail.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. A non-transitory computer readable storage medium for providing a tutorial for a first video game, wherein the tutorial is characterized by a hierarchical data structure having a plurality of nodes connected by edges in a plurality of edges,
   each node in the plurality of nodes represents (i) a game stage in the first video game, and (ii) a set of oral instructions on how to progress to another node in the plurality of nodes, and
   each edge in the plurality of edges represents one or more head movements necessary to move from one node to another node in the plurality of nodes,
   wherein the non-transitory computer readable storage medium stores (i) one or more programs for execution by one or more processors, (ii) the hierarchical data structure, and (iii) instructions for executing the first video game, the one or more programs collectively comprising instructions, which when executed by a device, cause the device to:
   identify a current node in the plurality of nodes;
   output, to a user of the first video game, a first set of oral instructions associated with the current node, on how to progress to another node in the plurality of nodes;
   sense one or more head movements of the user via one or more head movement measuring components, wherein the one or more head movements are made by the user within a predetermined time interval after outputting to the user the first set of oral instructions;
   determine, with the device, whether the sensed one or more head movements match an edge associated with the current node, wherein matching a respective edge associated with the current node comprises comparing the one or more sensed head movements to the one or more head movements represented by the respective edge associated with the current node;
   in accordance with a determination that the sensed one or more head movements match an edge associated with the current node, advance from the current node to the node identified by the matching edge; and
   in accordance with a determination that the sensed one or more head movements do not match any of the one or more edges associated with the current node, forgo advancing from the current node to another node.

2. The non-transitory computer readable storage medium of claim 1, wherein the comparing the one or more sensed head movements to the one or more head movements represented by the respective edge associated with the current node comprises comparing a position of a first element on a display of the computing device to a target position associated with the respective edge, wherein the position of the first element on the screen is controlled by the sensed one or more head movements.

3. The non-transitory computer readable storage medium of claim 1, wherein the one or more head movement measuring components includes a gyroscope, an accelerometer, or a compass.

4. The non-transitory computer readable storage medium of claim 1, wherein the one or more programs collectively include instructions, which when executed by the device, cause the device to output to the user a second set of oral instructions, associated with the current node, on how to progress to another node in the plurality of nodes.

5. The non-transitory computer readable storage medium of claim 4, wherein the first set of oral instructions include audio instruction only, and the second set of oral instructions includes both audio and video instruction.

6. The non-transitory computer readable storage medium of claim 4, wherein the first set of oral instructions is associated with a first length, the second set of oral instructions is associated with a second length, and the second length is greater than the first length.

7. The non-transitory computer readable storage medium of claim 4, wherein the first set of oral instructions is associated with a first detail level, the second set of oral instructions is associated with a second detail level, and the second detail level is greater than the first detail level.

8. The non-transitory computer readable storage medium of claim 4, wherein the second set of instructions is identified from a head movement that matches an edge associated with the current node.

9. The non-transitory computer readable storage medium of claim 4, wherein the second set of instructions is identified from an identity of the current node and an identity of a head movement in the sensed one or more head movements.

10. The non-transitory computer readable storage medium of claim 1, wherein the forgoing advancing from the current node to another node comprises placing the tutorial at a node in the plurality of nodes that precedes the current node in the hierarchical data structure.

11. The non-transitory computer readable storage medium of claim 1, wherein the forgoing advancing from the current node to another node comprises:
 maintaining the tutorial at the current node; and
 reducing a total number of remaining attempts associated with the current node.

12. The non-transitory computer readable storage medium of claim 1, wherein the node identified by the matching edge is connected with the current node by two or more edges.

13. The non-transitory computer readable storage medium of claim 12, wherein a respective edge in the two or more edges represents a distinct head movement that is necessary to move from the current node to the node identified by the matching edge.

14. The non-transitory computer readable storage medium of claim 12, wherein a respective edge in the two or more edges represents a distinct position of a first element on a display of the computing device wherein the position of the first element on the screen is controlled by the sensed one or more head movements.

15. The non-transitory computer readable storage medium of claim 12, wherein a respective edge in the two or more edges is associated with a reward to the user for progressing from the current node to the node identified by the matching edge.

16. The non-transitory computer readable storage medium of claim 15, wherein the reward is an in-game reward or an out-of-game reward.

17. The non-transitory computer readable storage medium of claim 16, wherein the out-of-game reward is one of:
 a discount for purchasing a second video game,
 a discount for purchasing merchandize described in the first video game,
 a discount for purchasing merchandize promoted by a publisher of the first video game; and
 a discount on an upsell of the first video game.

18. The non-transitory computer readable storage medium of claim 1, wherein comparing the one or more sensed head movements to the one or more head movements represented by the respective edge associated with the current node includes comparing one or more characteristics of a sensed head movement in the one or more sensed head movements with one or more characteristics of head movements represented by the respective edge wherein the one or more characteristics of the sensed head movement includes:
 a speed associated with the sensed head movement,
 an acceleration associated with the sensed head movement,
 a degree of the sensed head movement, and/or
 a direction of the sensed head movement.

19. The non-transitory computer readable storage medium of claim 1, wherein the predetermined time interval within which the one or more head movements are made by the user after being provided the first set of oral instructions is determined in accordance with a profile associated with the user.

20. The non-transitory computer readable storage medium of claim 19, wherein the profile associated with the user includes information identifying:
 an age of the user,
 an education level of the user,
 an language preference of the user,
 a gender of the user,
 a physical handicap associated with the user, and/or
 a geographical location of the user.

21. The non-transitory computer readable storage medium of claim 1, wherein the node identified by the matching edge is associated with a first complexity level, the current node is associated with a second complexity level, and the first complexity level is higher than the second complexity level.

22. The non-transitory computer readable storage medium of claim 1, wherein the node identified by the matching edge is associated with a first reward for completion, the current node is associated with a second reward for completion, and the first reward for completion is higher than the second reward for completion.

23. The non-transitory computer readable storage medium of claim 1, wherein the device is attached to the user's head.

24. The non-transitory computer readable storage medium of claim 1, wherein the device is connected with the Internet using: a cellar network connection, a wireless connection, a Bluetooth connection, and/or an infrared connection.

25. The non-transitory computer readable storage medium of claim 1, wherein
 the first video game is a shooting game,
 the edges in the hierarchical data structure collectively include a plurality of head movements, and
 the plurality of head movements comprises:
  a first head movement associated with an aiming action,
  a second head movement associated with a firing action,
  a third head movement associated with a loading action, and
  a fourth head movement associated with a moving action.

26. The non-transitory computer readable storage medium of claim 1, wherein
 the first video game is a first-person shooting game,
 the edges in the hierarchical data structure collectively include a plurality of head movements, and
 the plurality of head movements comprises:
  a first head movement associated with an aiming action;
  a second head movement associated with a firing action;
  a third head movement associated with a loading action; and
  a fourth head movement associated with a moving action.

27. The non-transitory computer readable storage medium of claim 1, wherein
 the first video game is a racing game,
 the edges in the hierarchical data structure collectively include a plurality of head movements, and
 the plurality of head movements comprises:
  a first head movement associated with an accelerating action;
  a second head movement associated with a braking action;
  a third head movement associated with a stopping action; and
  a fourth head movement associated with a turning action.

28. The non-transitory computer readable storage medium of claim 1, wherein
 the first video game is a role-playing game, and the edges in the hierarchical data structure collectively include a plurality of head movements, the plurality of head movements comprises:
   a first head movement associated with a moving action;
   a second head movement associated with a gesturing action; and
   a third head movement associated with a conversing action with another user in the video game.

29. The non-transitory computer readable storage medium of claim 1, wherein
   the first video game is a virtual reality game, and
   the edges in the hierarchical data structure collectively include a plurality of head movements,
   the plurality of head movements comprises:
      a first head movement associated with dressing up an avatar;
      a second head movement associated with moving the avatar;
      a third head movement associated with assigning a task to the avatar; and
      a fourth head movement associated with rewarding the avatar for completing the task.

30. The non-transitory computer readable storage medium of claim 1, wherein
   the first video game is a zombie game, and
   the edges in the hierarchical data structure collectively include a plurality of head movements,
   the plurality of head movements comprises:
      a first head movement associated with approaching a zombie;
      a second head movement associated with moving away from a zombie; and
      a third head movement associated with attacking a zombie.

* * * * *